(12) United States Patent
Jang

(10) Patent No.: US 11,584,090 B2
(45) Date of Patent: Feb. 21, 2023

(54) APPARATUS FOR MANUFACTURING DISPLAY DEVICE AND METHOD OF MANUFACTURING DISPLAY DEVICE

(71) Applicant: Samsung Display Co., Ltd., Yongin-si (KR)

(72) Inventor: Joo Nyung Jang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 127 days.

(21) Appl. No.: 16/735,913

(22) Filed: Jan. 7, 2020

(65) Prior Publication Data

US 2020/0282660 A1    Sep. 10, 2020

(30) Foreign Application Priority Data

Mar. 5, 2019   (KR) .................. 10-2019-0025165

(51) Int. Cl.
*B29C 65/08*    (2006.01)
*B29L 31/34*    (2006.01)

(52) U.S. Cl.
CPC ....... *B29C 65/08* (2013.01); *B29L 2031/3475* (2013.01)

(58) Field of Classification Search
CPC ............ B29C 65/08; B29L 2031/3475; B32B 2310/028; B23K 20/10; B23K 20/106; B06B 3/02
USPC .................. 156/73.1, 580.1, 580.2, 73.6
See application file for complete search history.

(56) References Cited

U.S. PATENT DOCUMENTS

| | | | | |
|---|---|---|---|---|
| 3,113,225 | A * | 12/1963 | Kleesattel | ............... B29C 66/80 310/26 |
| 7,887,656 | B2 * | 2/2011 | Yamamoto | ........ A61F 13/15699 156/64 |
| 10,090,223 | B2 | 10/2018 | Momose et al. | |
| 2004/0013449 | A1 * | 1/2004 | Fujimoto | .................. B06B 3/00 399/261 |
| 2005/0028942 | A1 * | 2/2005 | Rabe | ......................... B06B 3/00 156/580.2 |

(Continued)

FOREIGN PATENT DOCUMENTS

| | | | | | |
|---|---|---|---|---|---|
| GB | | 2124134 A | * | 2/1984 | ........... B29C 66/729 |
| JP | | 62273833 A | * | 11/1987 | ............. B29C 65/08 |

(Continued)

OTHER PUBLICATIONS

Machine translation of JP 62273833 date unknown.*

*Primary Examiner* — John L Goff, II
(74) *Attorney, Agent, or Firm* — H.C. Park & Associates, PLC

(57) ABSTRACT

There is provided a an apparatus for manufacturing a display device. An apparatus for manufacturing a display device comprises a body generating ultrasonic vibration; and a horn including a horn body portion connected to the body and amplifying the ultrasonic vibration and a horn tip portion connected to the horn body portion and applying the ultrasonic vibration onto a bonding object, wherein the horn body portion includes at least one body groove surrounded by the horn body portion and completely penetrating the horn body portion in a thickness direction from the surface of the horn body portion.

12 Claims, 22 Drawing Sheets
(2 of 22 Drawing Sheet(s) Filed in Color)

(56) References Cited

U.S. PATENT DOCUMENTS

2014/0190638 A1* 7/2014 Hull .................... B29C 66/8322
156/580.2
2018/0317326 A1 11/2018 Naganuma et al.

FOREIGN PATENT DOCUMENTS

JP 2018-190790 11/2018
KR 10-2012-0074791 7/2012

* cited by examiner

FIG. 16
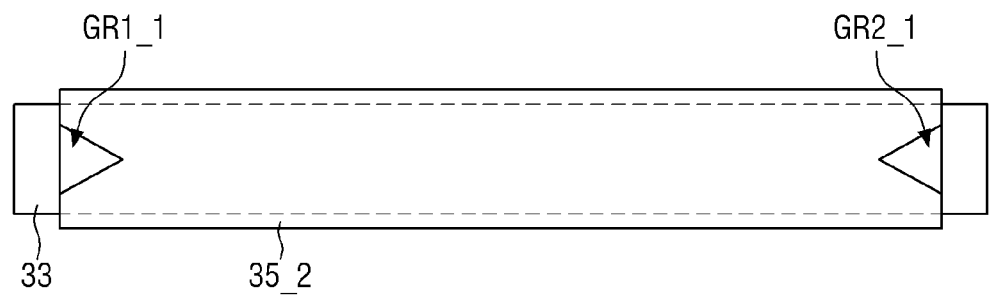
FIG. 17
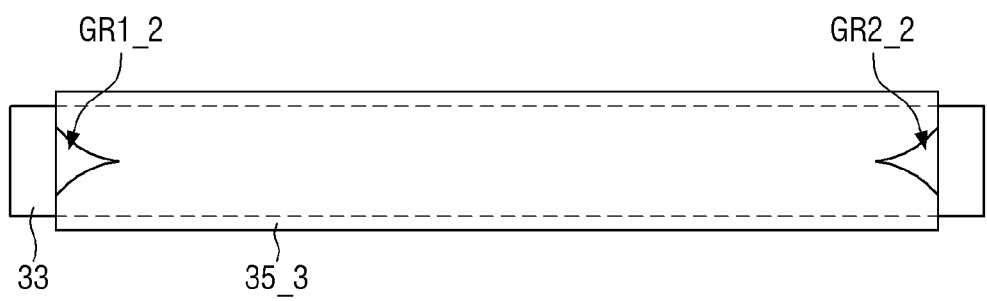
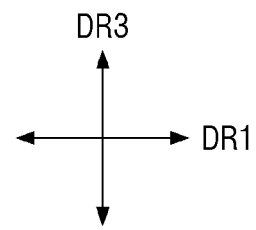

APPARATUS FOR MANUFACTURING DISPLAY DEVICE AND METHOD OF MANUFACTURING DISPLAY DEVICE

CROSS REFERENCE TO RELATED APPLICATION

This application claims priority from and the benefit of Korean Patent Application No. 10-2019-0025165, filed on Mar. 5, 2019, which is hereby incorporated by reference for all purposes as if fully set forth herein.

BACKGROUND

Field

The present invention relates to an apparatus for manufacturing a display device and a method of manufacturing a display device.

Discussion of the Background

A display device is a device for visually displaying data. Such a display device includes a substrate divided into a display area and a non-display area. A plurality of pixels are arranged on the substrate in the display area, and a plurality of pads are arranged on the substrate in the non-display area. The plurality of pads are connected with a flexible film (COF film) mounted with a driving circuit and the like to transmit driving signals to the pixels.

The flexible film includes a plurality of leads connected with the plurality of pads, and each of the leads may be bonded to a separate pad. The bonding may be performed by an ultrasonic bonding process.

Meanwhile, the ultrasonic bonding process may be performed through an ultrasonic device that applies a predetermined vibration to the flexible film and the pads. However, when a horn applying the vibration of the ultrasonic device to the flexible film and the pads has a different vibration width for each region, the bonding force between the lead and the pad may be different for each region. Thus, bonding failure of a display device may occur.

The above information disclosed in this Background section is only for understanding of the background of the inventive concepts, and, therefore, it may contain information that does not constitute prior art.

SUMMARY

An aspect of the present invention is to provide an apparatus for manufacturing a display device which applies a vibration of the same width for each region to a junction of the display device, as well as a method of manufacturing the display device.

Additional features of the inventive concepts will be set forth in the description which follows, and in part will be apparent from the description, or may be learned by practice of the inventive concepts.

According to an exemplary embodiment of the inventive concepts, an apparatus for manufacturing a display device includes a body generating ultrasonic vibration; and a horn including a horn body portion connected to the body and amplifying the ultrasonic vibration and a horn tip portion connected to the horn body portion and applying the ultrasonic vibration onto a bonding object, wherein the horn body portion includes at least one body groove surrounded by the horn body portion and completely penetrating the horn body portion in a thickness direction from the surface of the horn body portion.

The body groove may include a body through-hole completely penetrating the horn body portion in a thickness direction from the surface of the horn body portion.

The horn body portion may include a center line equally dividing the horn body portion in a first direction, the body groove includes a first body groove disposed on the center line, and the first direction is a direction from the body toward the horn body portion.

The body groove may include a second body groove disposed at one side of the first body groove in a second direction intersecting the first direction and a third body groove disposed at the other side of the first body groove in the second direction, and a distance from the first body groove to the second body groove is equal to a distance from the first body groove to the third body groove.

The length of the first body groove in the first direction may be greater than a length of the second body groove in the first direction, and is greater than a length of the third body groove in the first direction.

The horn body portion may have a uniform thickness along the first direction.

The horn body portion may include at least one of a metal, a metal compound, a non-metallic inorganic compound, and an organic compound, and the horn tip portion has a uniform amplitude along the second direction during ultrasonic vibration of the horn tip portion.

The difference between a minimum amplitude of the horn tip portion and a maximum amplitude of the horn tip portion may be 5% or less.

The horn tip portion may include a first surface connected to the horn body portion and a second surface facing the first surface, and the horn tip portion includes a tip groove recessed from edges spaced apart from each other along the second direction of the second surface.

The tip groove may be recessed in a direction from the second surface toward the first surface.

The body may include a power supply unit supplying a power, a signal converter converting an electrical signal of the supplied power into a vibration signal, and a vibration amplifier amplifying an amplitude of the vibration signal.

The bonding object may include a signal wiring disposed on a target panel and a lead wiring disposed on a printed circuit board, and the signal wiring and the lead wiring is ultrasonically bonded to each other.

The horn tip portion may be in direct contact with the printed circuit board and applies vibration to the printed circuit board.

According to an exemplary embodiment of the inventive concepts, an apparatus for manufacturing a display device includes a body generating ultrasonic vibration; and a horn including a horn body portion connected to the body and amplifying the ultrasonic vibration and a horn tip portion connected to the horn body portion and applying the ultrasonic vibration onto a bonding object, wherein the horn body portion includes at least one body groove surrounded by the horn body portion and completely penetrating the horn body portion in a thickness direction from the surface of the horn body portion, the horn tip portion includes a lower surface facing the bonding object, and the lower surface of the horn tip portion has a curved shape.

The curved shape of the lower surface may have a predetermined curvature.

According to an exemplary embodiment of the inventive concepts, a method of manufacturing a display device includes placing a target panel including a pad area provided with a plurality of signal wirings and a flexible printed circuit board including a plurality of lead wirings on the pad area of the target panel; and placing an ultrasonic bonding apparatus on the flexible printed circuit board and placing the horn tip portion to be in contact with the flexible printed circuit board, to transmit ultrasonic vibration to the flexible printed circuit board, the ultrasonic bonding apparatus including a body generating ultrasonic vibration, and a horn including a horn body portion connected to the body and amplifying the ultrasonic vibration and a horn tip portion connected to the horn body portion and applying the ultrasonic vibration onto a bonding object, wherein the horn body portion includes at least one body groove surrounded by the horn body portion.

The placing the flexible printed circuit board may include: placing the signal wiring and the lead wiring, corresponding to each other in a thickness direction, to be in direct contact with each other, and the transmitting the ultrasonic vibration includes: ultrasonically bonding the signal wiring to the lead wiring.

The plurality of signal wirings may be arranged along a first direction, a vibration direction of the ultrasonic vibration transmitted through the ultrasonic bonding apparatus is a second direction intersecting the first direction, and a region of the ultrasonic bonding apparatus contacting the flexible printed circuit board has a uniform vibration amplitude along the first direction, and a difference between a maximum value of the vibration amplitude and a minimum value of the vibration amplitude is 5% or less.

The body groove may include a body through-hole completely penetrating the horn body portion in a thickness direction from the surface of the horn body portion, and the horn body portion has a uniform thickness along the first direction.

The horn tip portion may include a first surface connected to the horn body portion and a second surface facing the first surface, the horn tip portion includes a tip groove recessed from edges spaced apart from each other along the second direction of the second surface, and the tip groove is recessed in a direction from the second surface toward the first surface and is terminated in the horn tip portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

The patent or application file contains at least one drawing executed in color. Copies of this patent or patent application publication with color drawings will be provided by the Office upon request and payment of the necessary fee.

FIG. 16 is a front view of a horn body portion and a horn tip portion of an apparatus for manufacturing a display device according to still another exemplary embodiment.

FIG. 17 is a front view of a horn body portion and a horn tip portion of an apparatus for manufacturing a display device according to still another exemplary embodiment.

DETAILED DESCRIPTION

Figure 1:
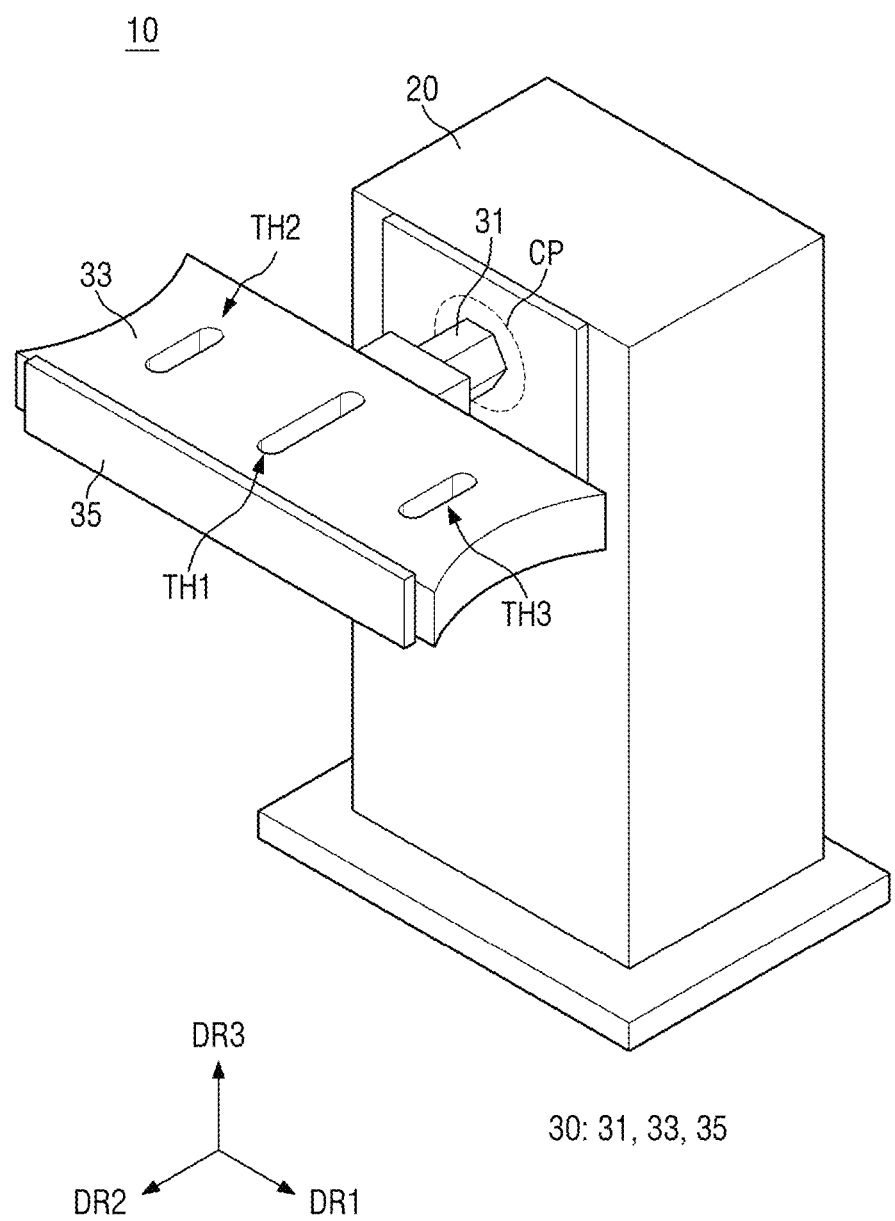
FIG. 1 is a perspective view of an apparatus for manufacturing a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
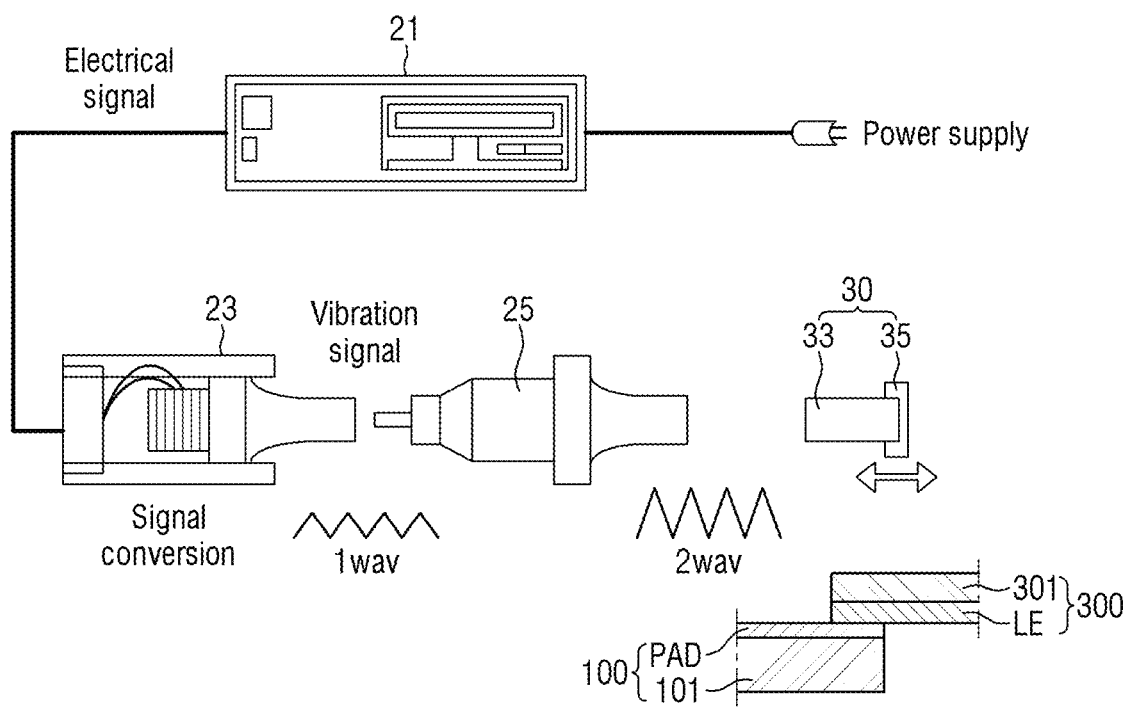
FIG. 2 is a block diagram showing the operations of components of an apparatus for manufacturing a display device.
Figure 3:
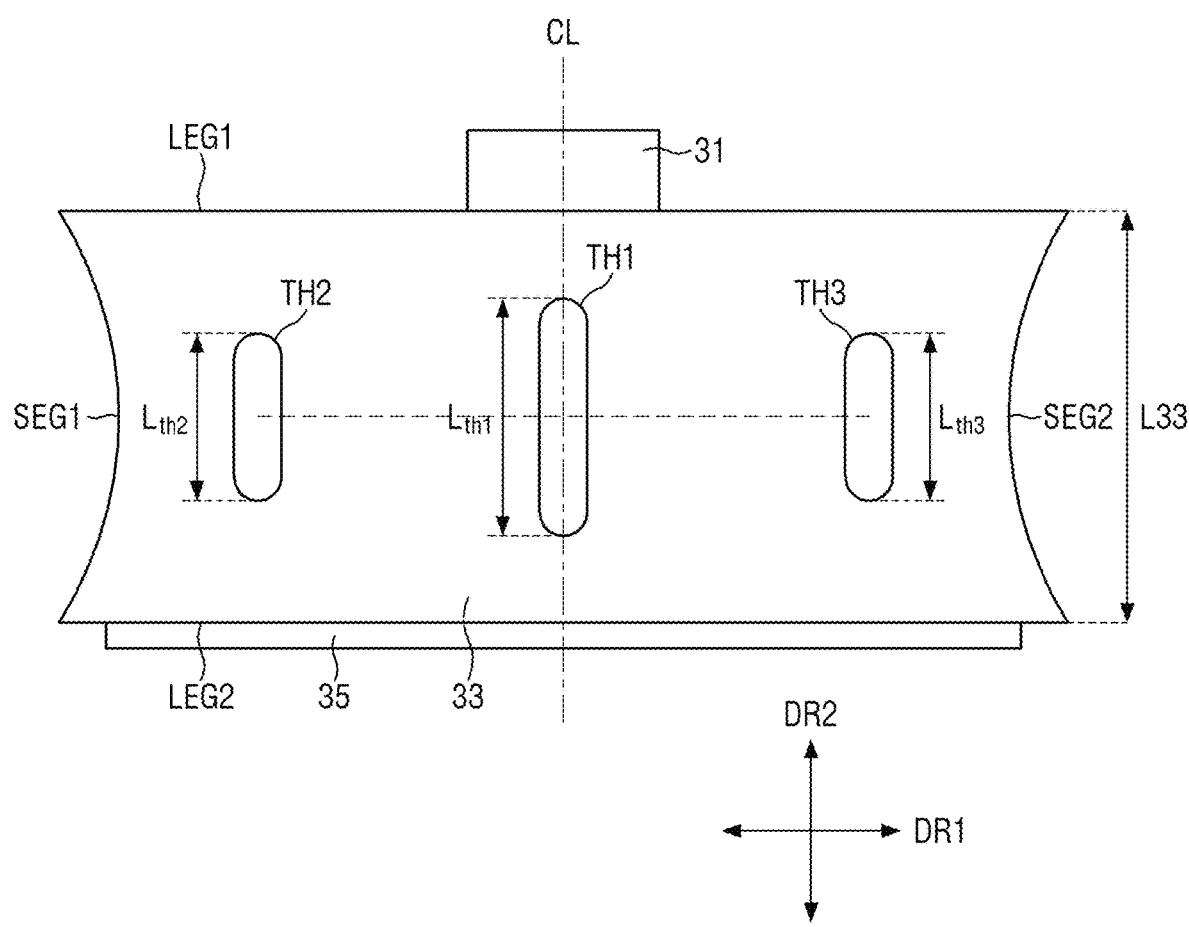
FIG. 3 is a plan view of a horn body portion and a horn tip portion of an apparatus for manufacturing a display device according to an exemplary embodiment.

FIG. 1 is a perspective view of an apparatus for manufacturing a display device according to an exemplary embodiment, FIG. 2 is a block diagram showing the operations of components of an apparatus for manufacturing a display device, FIG. 3 is a plan view of a horn body portion and a horn tip portion of an apparatus for manufacturing a display device according to an exemplary embodiment, FIG.

Figure 5:
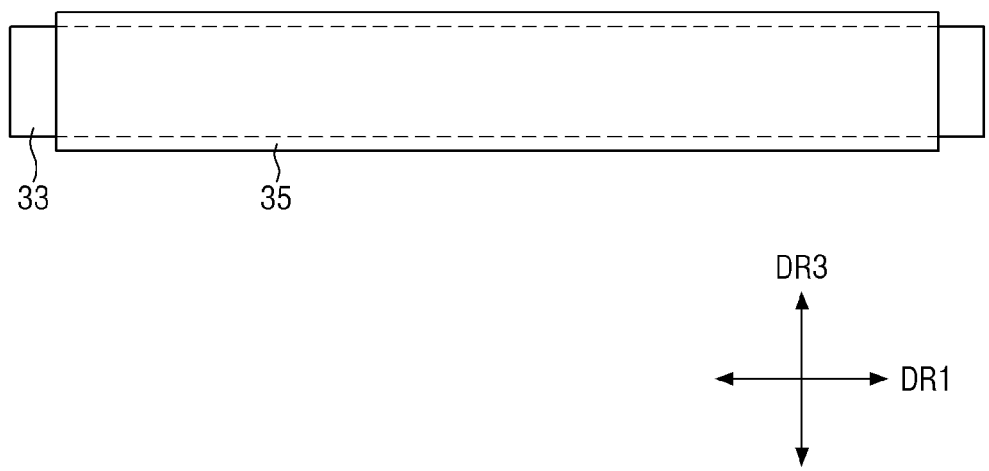
FIG. 5 is a front view of a horn body portion and a horn tip portion of an apparatus for manufacturing a display device according to an exemplary embodiment.

4 is a side view of a horn body portion and a horn tip portion of an apparatus for manufacturing a display device according to an exemplary embodiment, and FIG. 5 is a front view of a horn body portion and a horn tip portion of an apparatus for manufacturing a display device according to an exemplary embodiment.

An apparatus 10 for manufacturing a display device according to an exemplary embodiment may be a bonding apparatus for bonding a signal wiring of a display panel disposed on a junction of a display device to a lead wiring of a flexible printed circuit board. More specifically, the apparatus 10 for manufacturing a display device according to an exemplary embodiment may be an ultrasonic bonding apparatus designed such that the applied ultrasonic frequency is matched with the resonance frequency of the apparatus 10. The ultrasonic bonding apparatus may directly bond the signal wiring of the display panel to the lead wiring of the flexible printed circuit board. That is, the signal wiring and the lead wiring may be directly bonded to each other by ultrasonic bonding.

The applied ultrasonic frequency is matched with the resonance frequency, the ultrasonic bonding apparatus may efficiently bond the signal wiring and the lead wiring to each other.

The display device, which is a device for displaying a mobile image or a still image, may be used as a display screen of various products such as televisions, notebooks, monitors, billboards, and internet of things, as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs.

For example, the display device may be at least one of a liquid crystal display (LCD), a quantum dot organic light emitting display (QD-OLED), a quantum dot liquid crystal display (QD-LCD), a quantum nano light emitting display (NanoLED), and a micro light emitting display (micro-LED).

Referring to FIGS. 1 to 5, the apparatus 10 for manufacturing a display device according to an exemplary embodiment includes a body 20, and a horn 30 connected to the body 20. The horn 30 includes a horn connection portion 31 physically connected to the body 20, a horn body portion 33 connected to the horn connection portion 31, and a horn tip portion 35 connected to the horn body portion 33.

The body 20 serves to transmit a vibration signal to the horn 30. The vibration signal may be vibration energy.

The horn connection portion 31 of the horn 30 may be physically connected with the body 20 through a connection portion CP of the body 20.

The horn body portion of the horn 30 may serve to transmit the vibration signal received from the body 20 to the horn tip portion 35 of the horn 30.

The horn tip portion 35 of the horn 30 may bond a bonding object through the vibration signal received from the horn body portion 33. That is, the horn tip portion 35 may serve to directly apply the vibration signal onto the flexible printed circuit film of the bonding portion of the display device to directly bond the signal wiring to the lead wiring.

Referring to FIG. 2, the body 20 of the apparatus 10 for manufacturing a display device includes a power supply unit 21 generating an electrical signal, a signal converter 23 converting the electrical signal received from the power supply unit 21 into a vibration signal, and a vibration amplifier 25 amplifying the vibration amplitude of the vibration signal.

The power supply unit 21 receives power through an external power supply. The power supply unit 21 may convert the power received from the external power supply into an electric signal. The electrical signal converted by the power supply unit 21 may be transmitted to the signal converter 23. The electric signal may have a higher frequency than the power. For example, the frequency of the power may be about 60 Hz, and the frequency of the electrical signal may be about 20 kHz, 35 kHz, or 40 kHz, but the inventive concepts are not limited thereto.

The signal converter 23 converts the electrical signal received from the power supply unit 21 into a vibration signal and transmits the vibration signal to the vibration amplifier 25. The vibration signal may have a wave 1 wav as shown in FIG. 2. The vibration signal vibrates the horn 30, and the vibration direction of the vibration signal may be a second direction DR2 as shown in FIG. 1.

The vibration amplifier 25 amplifies the amplitude of the vibration signal received from the signal converter 23 and transmits the amplified vibration signal to the horn 30. The amplified vibration signal may have a wave 2wav as shown in FIG. 2. The frequency of the wave 2wav is equal to that of the aforementioned wave 1wav, but the amplitude of the wave 2wav may be greater than that of the wave 1wav.

The horn body portion 33 of the horn 30 may transmit the amplified vibration signal received from the vibration amplifier 25 to the horn tip portion 35 of the horn 30. The horn body portion 33 may transmit a vibration signal having the same amplitude intensity as the amplified vibration signal received from the vibration amplifier 25 to the horn tip portion 35 as it is, but the inventive concepts are not limited thereto, and the horn body portion 33 amplifies the amplified vibration signal received from the vibration amplifier 25 and transmits a vibration signal having larger amplitude intensity than this amplified vibration signal to the horn tip portion 35.

The horn tip portion 35 of the horn 30 may bond the bonding object through the vibration signal received from the horn body portion 33.

As described above, the bonding object may include: a display panel including a display substrate 101 and a signal wiring PAD disposed on the display substrate 101; and a flexible printed circuit board 300 including a base substrate 301 and a lead wiring LE disposed on the base substrate 301.

When the horn 30 vibrates along the second direction DR2 with the amplified vibration signal received from the vibration amplifier 25, the horn tip portion 35 may be vibrate along the first direction DR1 with different amplitudes from each other. The reason for this is that the horn 30 exhibits an elastic behavior over the entire region along the first direction DR1 when the amplified vibration signal applied to the horn 30 is very great.

The horn 30 may include a material that exhibits an elastic behavior when the amplified vibration signal is applied. For example, the horn 30 may include a metal, a metal compound, a nonmetallic inorganic compound, or an organic compound. For example, the horn 30 may include a metal such as tungsten (W), copper (Cu), silver (Ag), gold (Au), platinum (Pt), aluminum (Al), iron (Fe), or titanium (Ti), an oxide thereof, a nitride thereof, a halogen compound thereof, or a combined alloy thereof.

Thus, the horn body portion 33 of the horn 30 may provided therein with horn grooves TH1, TH2, and TH3 surrounded by the horn body portion 33 such that the horn body portion 33 vibrates with the same amplitude along the first direction DR1. The horn grooves TH1 to TH3 may be arranged to be spaced apart from each other along the first direction DR1.

The horn grooves TH1 to TH3 may be completely surrounded by the constituent material of the horn body portion 33. The horn grooves TH1 to TH3 may include throughholes that completely penetrate the horn body portion 33 in the thickness direction from the surface of the horn body portion 33.

The horn grooves TH1 to TH3 may allow the horn 30 of the display device manufacturing apparatus 10, to which a vibration signal is applied, to have the same width for each region thereof. Thus, the horn 30 of the display device manufacturing apparatus 10 may apply the vibration signal having the vibration amplitude for each region to the bonding object to prevent the bonding failure of the bonding object.

More specifically, the horn body portion 33 of the horn 30 includes long side edges LEG1 and LEG2 extending along the first direction DR1 and curved short side edges SEG1 and SEG2 extending along the second direction DR2. The horn body portion 33 may further include a reference line CL for equally dividing the long side edges LEG1 and LEG2.

The first horn groove TH1 of the horn body portion 33 may be disposed to overlap the reference line CL of the horn body portion 33. That is, the first horn groove TH1 may be disposed at the center of the horn body portion 33 in the first direction DR1.

Assuming that the vibration energy due to the vibration signal applied to the horn body portion 33 is constant, the mass of the horn body portion 33 may be in inverse proportion to the vibration amplitude thereof. When the first horn groove TH1 may be disposed at the center of the horn body portion 33, the mass of the central region of the horn body portion 33 decreases to increase the vibration amplitude of the central region, thereby increasing the vibration amplitude of the central regions of the horn tip portion 35.

A second horn groove TH2 is disposed at one side of the first horn groove TH1 in the first direction DR1, and a third horn groove TH3 may be disposed at the other side of the first horn groove TH1 in the first direction DR1. That is, the third horn groove TH3 may be spaced apart from the second horn groove TH2 with the first horn groove TH1 therebetween.

Similarly to the first horn groove TH1, each of the second horn groove TH2 and the third horn groove TH3 increases the vibration amplitude of the horn body portion 33 to increase the vibration amplitude of the central region of the horn tip portion 35. That is, even when the first horn groove TH1 increases the vibration amplitude of the central region of the horn body portion 33 to increase the vibration amplitude of the central region of the horn tip portion 35, an increase in the vibration amplitude may be small around the central regions of the horn body portion 33 and the horn tip portion 35. For the purpose of preventing this problem, the second horn groove TH2 and the third horn groove TH3 are arranged at one side and the other side of the first horn groove TH1 in the first direction DR1, thereby allowing the horn body portion 33 and the horn tip portion 35 to have a uniform vibration amplitude over the entire region in the first direction DR1.

As shown in FIG. 3, the distance between the second horn groove TH2 and the first horn groove TH1 may be equal to the distance between the third horn groove TH3 and the first horn groove TH1. That is, the horn grooves TH1 to TH2 of the horn body portion 33 may be arranged symmetrically along the first direction DR1 of the horn body portion 33 in a plan view. Thus, it is possible to prevent vibration amplitude non-uniformity occurring when the horn grooves TH1, TH2, and TH3 are irregularly arranged such that uniform vibration amplitude is applied to the entire region of the horn body portion 33 and the horn tip portion 35.

The length LTH1 of the first horn groove TH1 in the second direction DR2 may be about 0.2 times to about 0.8 times the length L33 of the horn body portion 33 in the second direction DR2. When the length LTH1 of the first horn groove TH1 in the second direction DR2 may be about 0.2 times or more of the length L33 of the horn body portion 33 in the second direction DR2, it is possible to effectively increase the vibration amplitude of the horn body portion 33 and the horn tip portion 35. When the length LTH1 of the first horn groove TH1 in the second direction DR2 may be about 0.8 times or less the length L33 of the horn body portion 33 in the second direction DR2, the vibration amplitude of the central region of the horn body portion 33 and the horn tip portion 35 is larger than the vibration amplitude of the peripheral region of the horn body portion 33 and the horn tip portion 35, so that it is possible to prevent the non-uniform vibration amplitude over the entire region of the horn body portion 33 and the horn tip portion 35.

The length LTH1 of the first horn groove TH1 in the second direction DR2 may be greater than the length LTH2 of the adjacent second horn groove TH2 in the second direction DR2 or the length LTH3 of the adjacent third horn groove TH3 in the second direction DR2. However, the inventive concepts are not limited thereto, and the length LTH1 may be equal to the length LTH2 or the length LTH3.

Although it is shown in FIG. 3 that the number of the horn grooves in the horn body portion 33 is three, the number thereof may be changed depending on the length of the second long side edge LEG2 of the horn body portion 33 in the first direction DR1. For example, when the length of the second long side edge LEG2 of the horn body portion 33 is about 80 mm to about 135 mm, the number of the horn grooves may be 2 to 4. When the number of the horn grooves is three, the arrangement of the horn grooves TH1 to TH3 may be applied. Further, when the number of the horn grooves is two, the second horn groove TH2 and the third horn groove TH3, shown in FIG. 3, may be applied, and the first horn groove TH1 may not be applied. When the number of the horn grooves is four, these horn grooves at regular intervals along the first direction DR1. In this case, in the respective horn grooves, the shape and size of the first horn groove TH1 or the second horn groove TH2 may be applied, but the inventive concepts are not limited.

In some exemplary embodiments, when the length of the second long side edge LEG2 of the horn body portion 33 is about 45 mm or less, the number of the horn grooves may be one. That is, when one horn groove is applied, the first horn groove TH1 may be applied, and the second horn groove TH2 and the third horn groove TH3 may not be applied.

In some exemplary embodiments, when the length of the second long side edge LEG2 of the horn body portion 33 is about 45 mm to about 80 mm, the number of the horn grooves may be one or two. That is, when one horn groove is applied, the first horn groove TH1 shown in FIG. 3 may be applied, and the second horn groove TH2 and the third horn groove TH3 shown in FIG. 3 may not be applied, and when two horn grooves are applied, the second horn groove TH2 and the third horn groove TH3 shown in FIG. 3 may be applied, and the first horn groove TH1 shown in FIG. 3 may not be applied.

In some exemplary embodiments, when the length of the second long side edge LEG2 of the horn body portion 33 is about 135 mm or more, the number of the horn grooves may be four. The respective horn grooves may be arranged at regular intervals along the first direction DR1. In this case, each of the horn grooves may have the same shape and size as the first horn groove TH1 or the second horn groove TH2, but the inventive concepts are not limited thereto.

Figure 4:
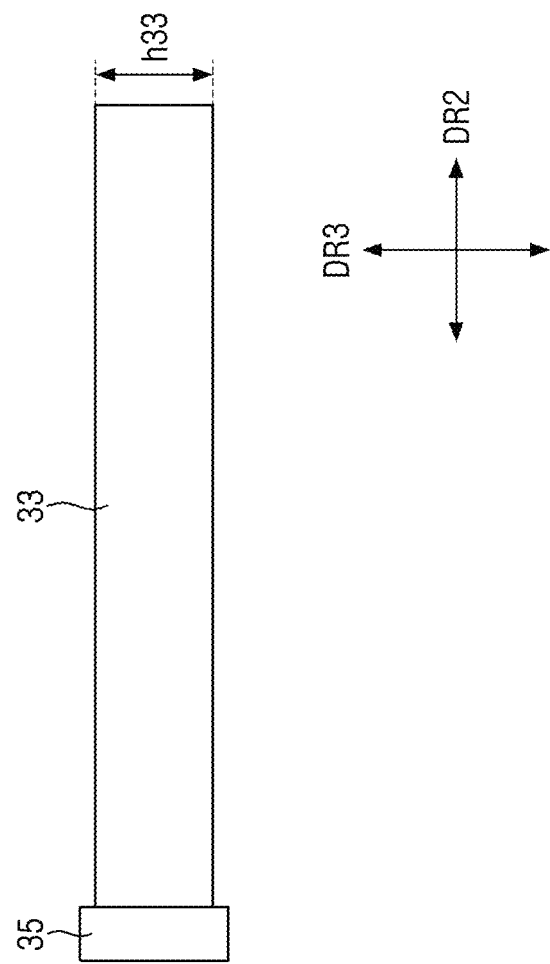
FIG. 4 is a side view of a horn body portion and a horn tip portion of an apparatus for manufacturing a display device according to an exemplary embodiment.

Referring to FIG. 4, the horn body portion 33 according to an exemplary embodiment may have a uniform thickness h33 along the third direction DR3. For example, the difference between the maximum thickness of the horn body portion 33 and the minimum thickness of the horn body portion 33 may be about 0.9 to about 1 time. One end of the horn body portion 33 adjacent to the horn tip portion 35 in the second direction DR2 may have the minimum thickness of the horn body portion 33, and the other end of the horn body portion 33 facing the one end of the horn body portion 33 in the second direction DR2 may have the maximum thickness of the horn body portion 33.

That is, as described above, the mass of the horn body portion 33 is in inverse proportion to the vibration amplitude thereof. When a thickness difference occurs in the region along the second direction DR2 of the horn body portion 33, in some regions, an increase in vibration amplitude due to mass reduction may increase. The vibration signal having a non-uniform vibration amplitude occurring due to the thickness difference in the region of the horn body portion 33 along the second direction DR2 may be transmitted to the horn tip portion 35 through a reinforcement and/or cancellation behavior to have a non-uniform vibration amplitude over the entire region of the horn body portion 33 and the horn tip portion 35.

The horn body portion 33 according to an exemplary embodiment have a uniform thickness h33 along the second direction DR2 to have a uniform vibration amplitude over the entire region of the horn body portion 33 and the horn tip portion 35 in the first direction DR1.

Hereinafter, a method of manufacturing a display device according to another exemplary embodiment will be described. In the following exemplary embodiment, the same reference numerals as those in the aforementioned exemplary embodiment are referred to as the same reference numerals, and a description thereof will be omitted or simplified.

Figure 6:
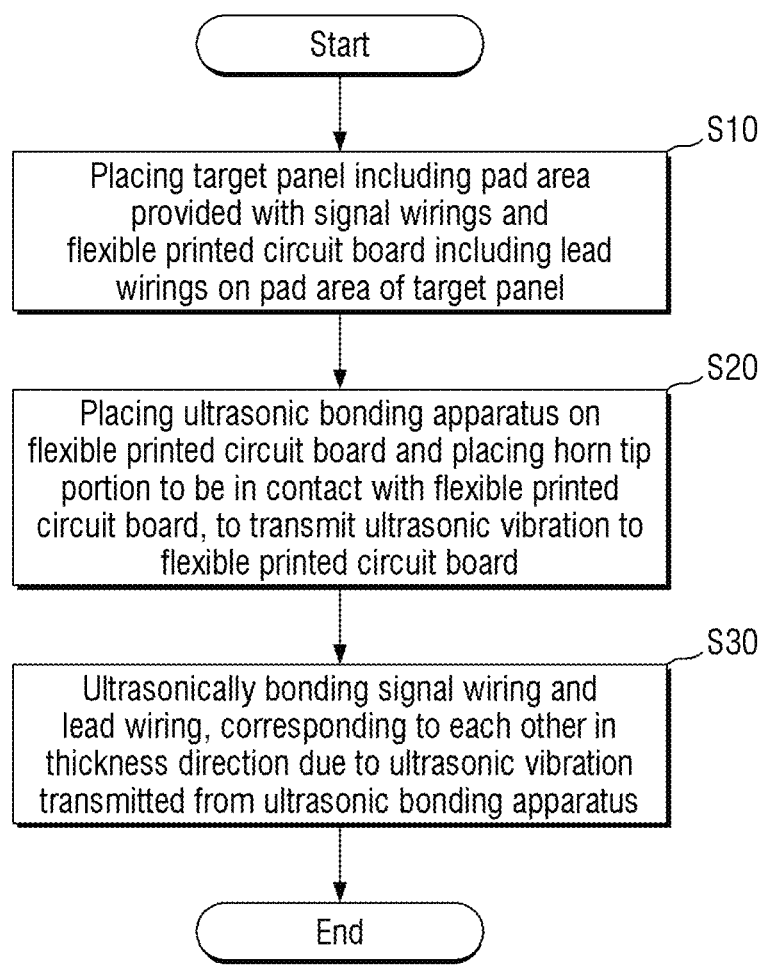
FIG. 6 is a flowchart of a method of manufacturing a display device according to another exemplary embodiment.
Figure 7:
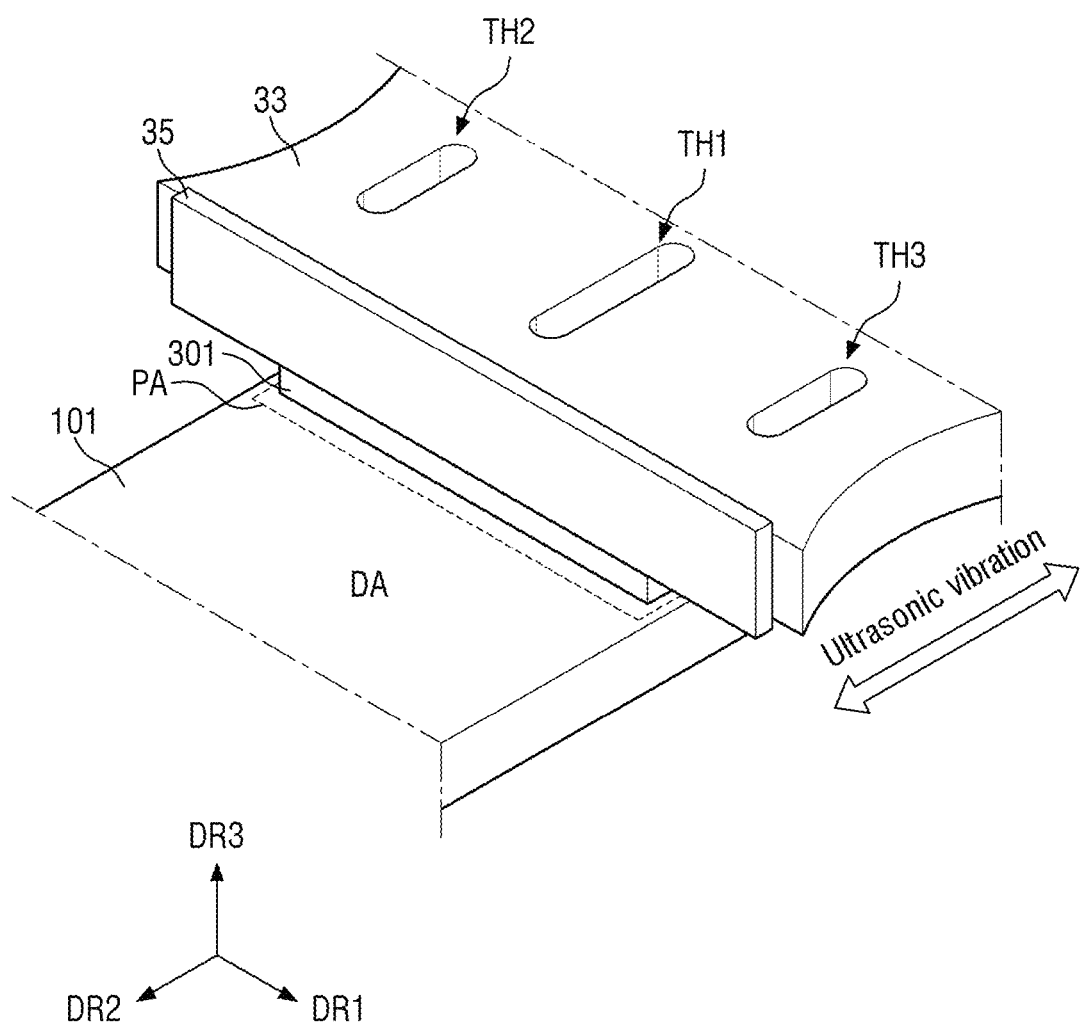
FIG. 7 is a perspective view showing the bonding of a bonding object by a manufacturing apparatus for a display device according to another exemplary embodiment.
Figure 8:
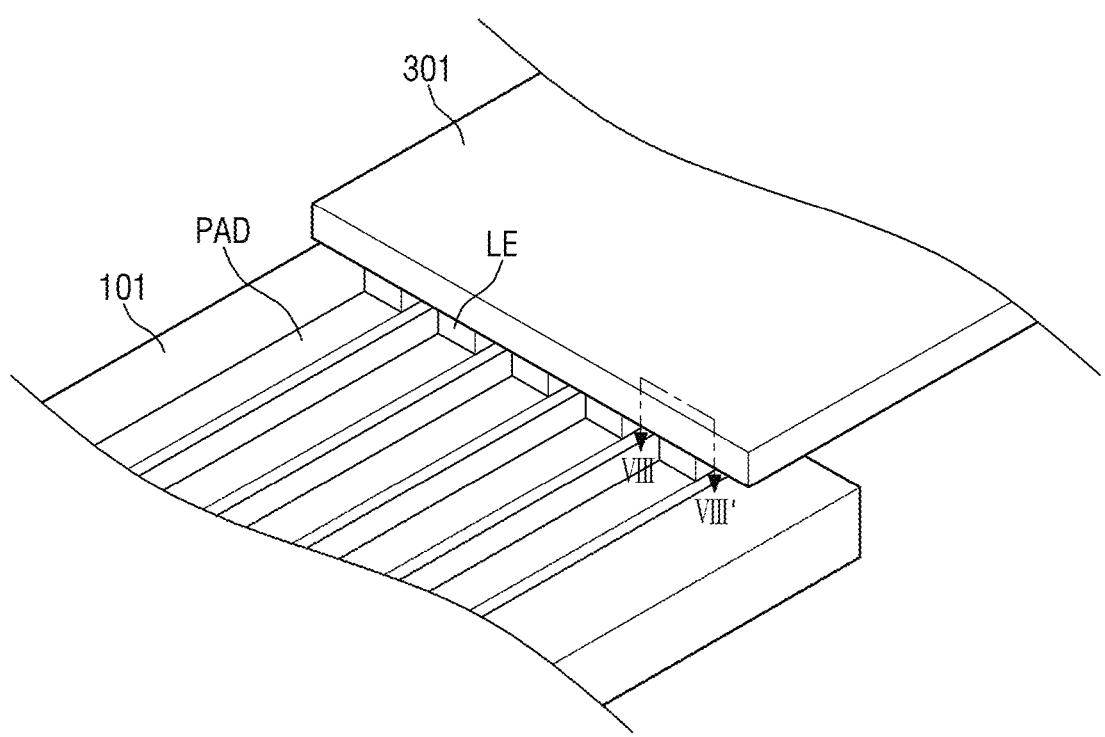
FIG. 8 is a perspective view showing a signal wiring and a lead wiring which are bonded to each other.
Figure 9:
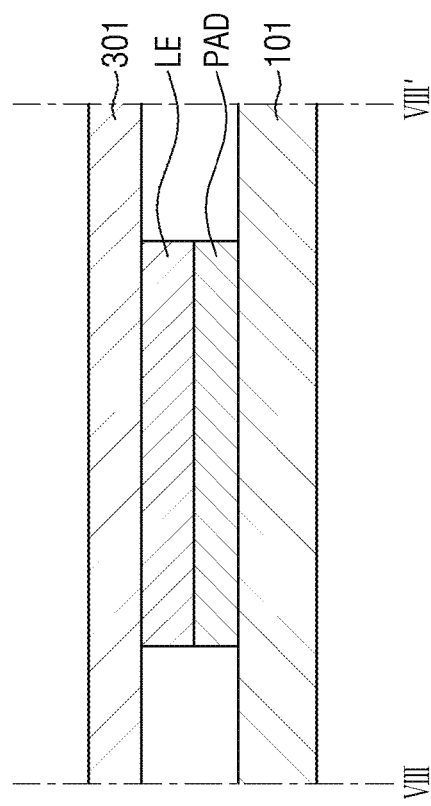
FIG. 9 is a cross-sectional view taken along the line VIII-VIII' of FIG. 8.
Figure 10:
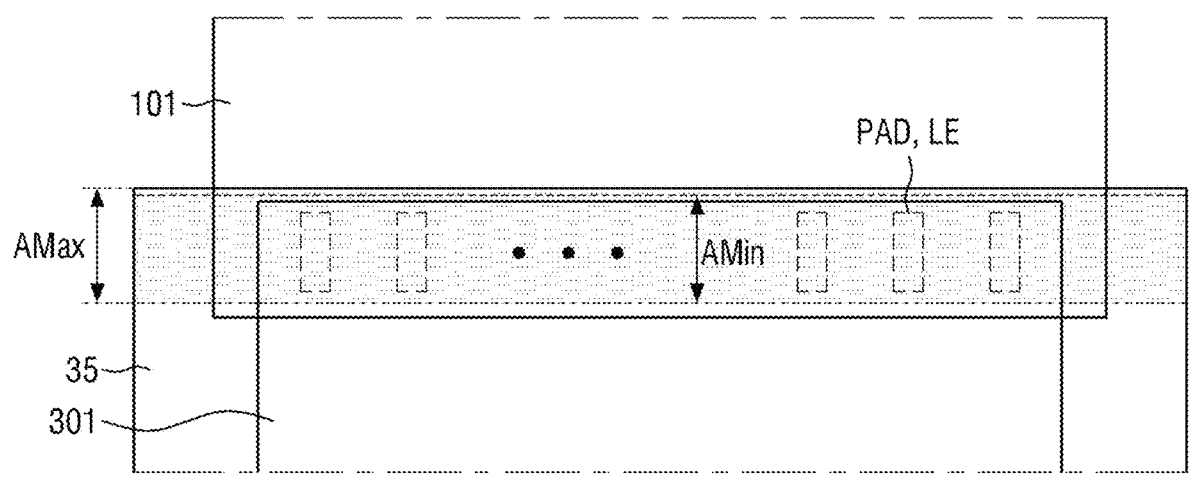
FIG. 10 is a plan view showing the maximum vibration amplitude and minimum vibration amplitude of a horn tip portion at the time of bonding of a bonding object.
Figure 11A:
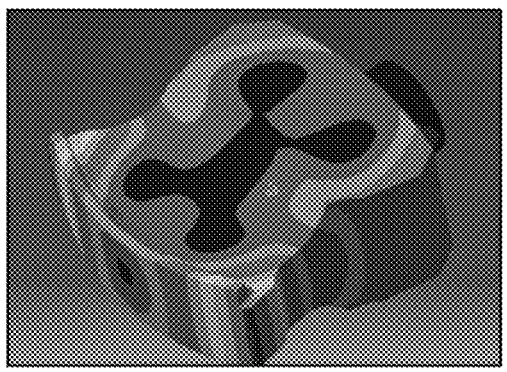
FIGS. 11A and 11B are views showing vibration amplitudes of respective regions of a manufacturing apparatus for a display device.
Figure 11B:
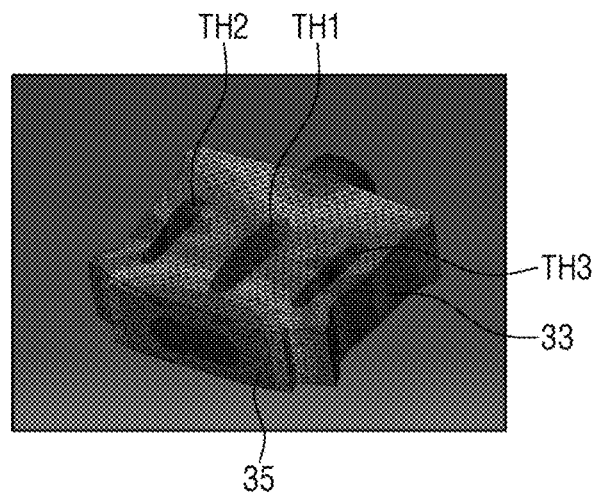

FIG. 6 is a flowchart of a method of manufacturing a display device according to another exemplary embodiment, FIG. 7 is a perspective view showing the bonding of a bonding object by an apparatus for manufacturing a display device according to another exemplary embodiment, FIG. 8 is a perspective view showing a signal wiring and a lead wiring which are bonded to each other, FIG. 9 is a cross-sectional view taken along the line VIII-VIII' of FIG. 8, FIG. 10 is a plan view showing the maximum vibration amplitude and minimum vibration amplitude of a horn tip portion at the time of bonding of a bonding object, and FIGS. 11A and 11B are views showing vibration amplitudes of respective regions of an apparatus for manufacturing a display device.

FIG. 10 is a plan view showing the maximum vibration amplitude and minimum vibration amplitude of a horn tip portion at the time of bonding of a bonding object, and FIGS. 11A and 11B are views showing vibration amplitudes of respective regions of an apparatus for manufacturing a display device. FIG. 11A shows the vibration amplitude of the horn tip portion 35 of the apparatus 10 for manufacturing a display device for each region in the first direction DR1 when the apparatus 10 for manufacturing a display device does not include the horn grooves TH1, TH2, and TH3.

Referring to FIGS. 6 to 10 and 11A and 11B, in the method of manufacturing a display device according to another exemplary embodiment, a display device is manufactured using the aforementioned display device manufacturing apparatus 10 (hereinafter, for convenience of explanation, an apparatus for manufacturing a display device will be described as a display device manufacturing apparatus).

First, a target panel including a pad area PA provided with a plurality of signal wirings PAD, and a flexible printed circuit board including a plurality of lead wirings LE on the pad area PA of the target panel are arranged (S10). The target panel may be the aforementioned bonding object. The bonding object may include a signal wiring PAT disposed on the display substrate 101 and a lead wiring LE disposed on the base substrate 301.

The step S10 of arranging the flexible printed circuit board may include a step of arranging the signal wiring PAD and the lead wiring LE, corresponding to each other in the thickness direction, so as to be in direct contact with each other.

More specifically, the display substrate 101 may include a display area DA for displaying an image and a pad area PA located around the display area DA. The plurality of signal wirings PAD disposed on the display substrate 101 may be disposed on the pad area PA of the display substrate 101. The plurality of signal wirings PAD and the plurality of lead wirings LE may be arranged along the first direction DR1.

Subsequently, the display device manufacturing apparatus 10 is located to be in contact with the flexible printed circuit board 300 to transmit an ultrasonic vibration (S20). As described above, the plurality of signal wirings PAD may be arranged along the first direction DR1, and the vibration direction of the ultrasonic vibration transmitted through the display device manufacturing apparatus 10 may be the second direction DR2 intersecting the first direction DR1.

The horn tip portion 35 of the display device manufacturing apparatus 10 may be disposed on the upper surface of the flexible printed circuit board 300, may be in direct contact with the base substrate 301, and may apply the vibration signal in the second direction DR2 to ultrasonically the signal wiring PAD and the lead wiring LE. Moreover, the horn tip portion 35 may apply pressure in the downward direction through the base substrate 301 to further facilitate the contact between the signal wiring PAD and the lead wiring LE. That is, the horn tip portion 35 may have a vibration amplitude in the second direction DR2, and may mutually ultrasonically vibrate the signal wiring PAD and the lead wiring LE. The base substrate 301 contacting the horn tip portion 35 may vibrate substantially simultaneously with the horn tip portion 35 in the vibration direction of the horn tip portion 35, for example, in the second direction DR2. Thus, the signal wiring PAD and the lead wiring LE may be ultrasonically bonded by the display device manufacturing apparatus 10.

The region contacting the flexible printed circuit board 300 of the display device manufacturing apparatus 10 may have a uniform vibration amplitude along the first direction DR1, and specifically, a difference between the maximum value of the vibration amplitude and the minimum value of the vibration amplitude may be 5% or less.

The display substrate 101 may be a rigid substrate including a rigid material such as glass or quartz. However, the inventive concepts are not limited thereto, and the display substrate 101 may be a flexible substrate including a flexible material such as polyimide (PI).

The signal wiring PAD may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The signal wiring PAD may be a single film made of the exemplified material. However, the inventive concepts are not limited thereto, and the signal wiring PAD may be a laminated film.

The base substrate 301 may include a flexible organic insulating material. For example, the base substrate 301 may include a base film.

The lead wiring LE may include a metal material. The lead wiring LE may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

Subsequently, the signal wiring PAD and the lead wiring LE, corresponding to each other in the thickness direction are ultrasonically bonded by the ultrasonic vibration generated from an ultrasonic bonding apparatus (S30). The step of ultrasonically bonding the signal wiring PAD and the lead wiring LE may include a step of at least partially melting the signal wiring PAD and the lead wiring LE at a mutual interface and solidifying and bonding the molten product.

More specifically, when the lead wiring LE is ultrasonically vibrated on one surface of the signal wiring PAD, a predetermined frictional force is generated at the interface between one surface of the signal wiring PAD and one surface of the lead wiring LE, and frictional heat may be generated due to the frictional force. When the frictional heat is sufficient to melt the material constituting the wiring line PAD and the lead line LE, a pad melting region of the signal wiring PAD adjacent to the lead wiring LE and a lead melting region of the lead wiring LE adjacent to the signal wiring PAD may be respectively melted. That is, the signal wiring PAD may include a pad non-melting region and the pad melting region. Further, the lead wiring LE may include a lead non-melting region and the lead melting region.

The pad non-melting region may be a region including only the material included in the signal wiring PAD. The lead non-melting region may be a region including only the material included in the lead wiring LE.

The pad melting region is a region in which the material included in the lead wiring LE is diffused and thus the material of the signal wiring PAD and the material of the lead wiring LE are mixed with each other. The lead melting region is a region in which the material included in the signal wiring PAD is diffused and thus the material of the lead wiring LE and the material of the signal wiring PAD are mixed with each other.

The signal wiring PAD and the lead wiring LE may be bonded to each other in the pad melting region and the lead melting region while solidifying. The interface between the signal wiring PAD and the lead wiring LE, that is, the interface between the pad melting region and the lead melting region may have a non-flat shape.

Referring to FIGS. 10, 11A, and 11B, as described above, the signal wiring PAD disposed on the display substrate 101 and the horn tip portion 35 disposed on the lead wiring LE on the base substrate 301 may apply a vibration signal having a uniform vibration amplitude along the first direction DR1 to the signal wiring PAD and the lead wiring LE.

The vibration signal of the horn tip portion 35 may have a maximum vibration amplitude AMAX and a minimum vibration amplitude AMIN. The difference between the maximum vibration amplitude AMAX and minimum vibration amplitude AMIN of the vibration signal of the horn tip portion 35 may be less than about 5%.

In the display device manufacturing apparatus 10 according to an exemplary embodiment, as shown in FIG. 11B, one side and the other side of the first horn groove TH1 of the horn body portion 33 are provided with the second horn groove TH2 and the third horn groove TH3, respectively, and thus the horn body portion 33 and the horn tip portion 35 may have a uniform vibration amplitude over the entire region along the first direction DR1.

Further, in the display device manufacturing apparatus 10 according to an exemplary embodiment, as shown in FIG. 11B, the horn body portion 33 has a uniform thickness h33 along the second direction DR2, and thus the horn body portion 33 and the horn tip portion 35 may have a uniform vibration amplitude over the entire region along the first direction DR1.

Figure 12:
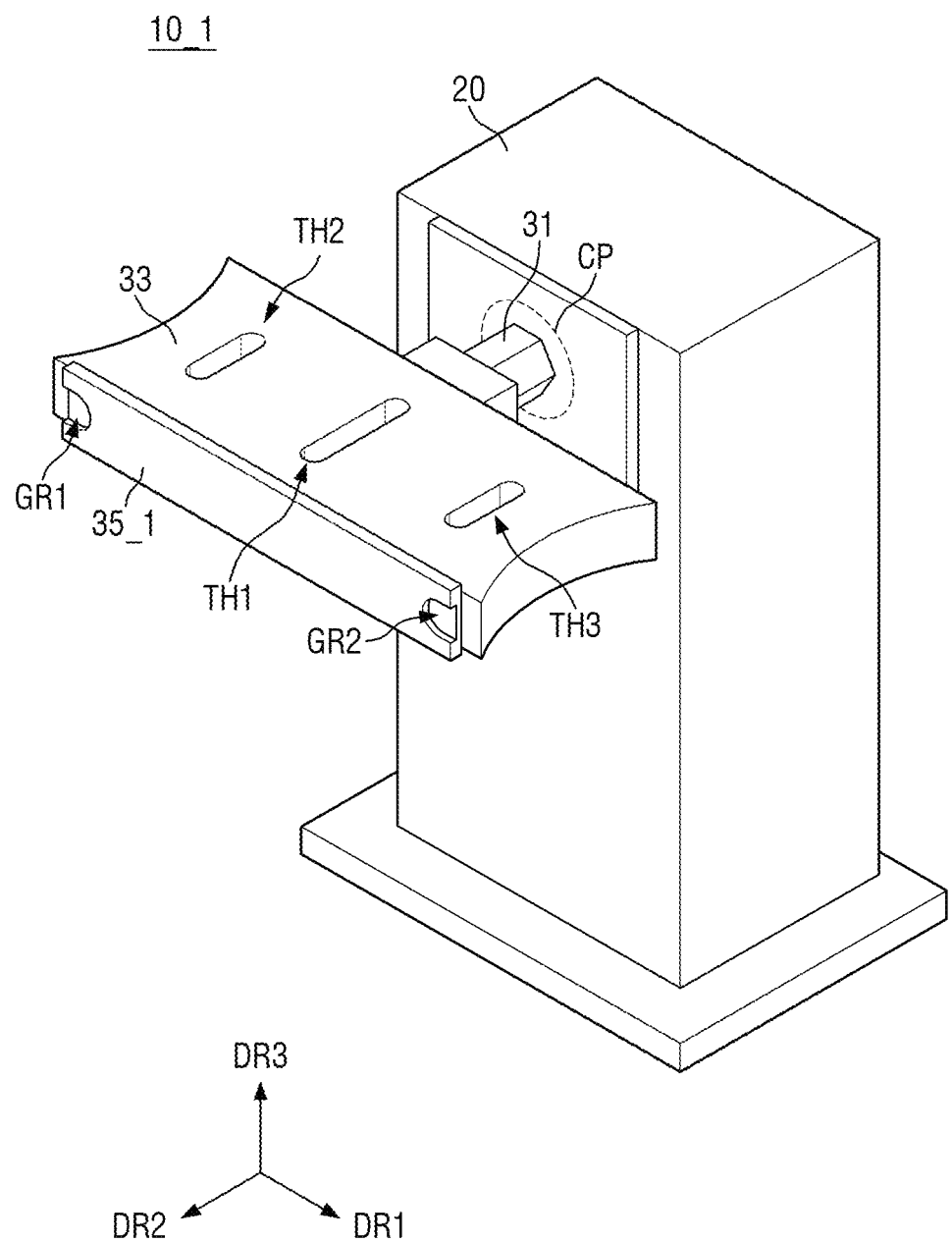
FIG. 12 is a perspective view of an apparatus for manufacturing a display device according to another exemplary embodiment.
Figure 13:
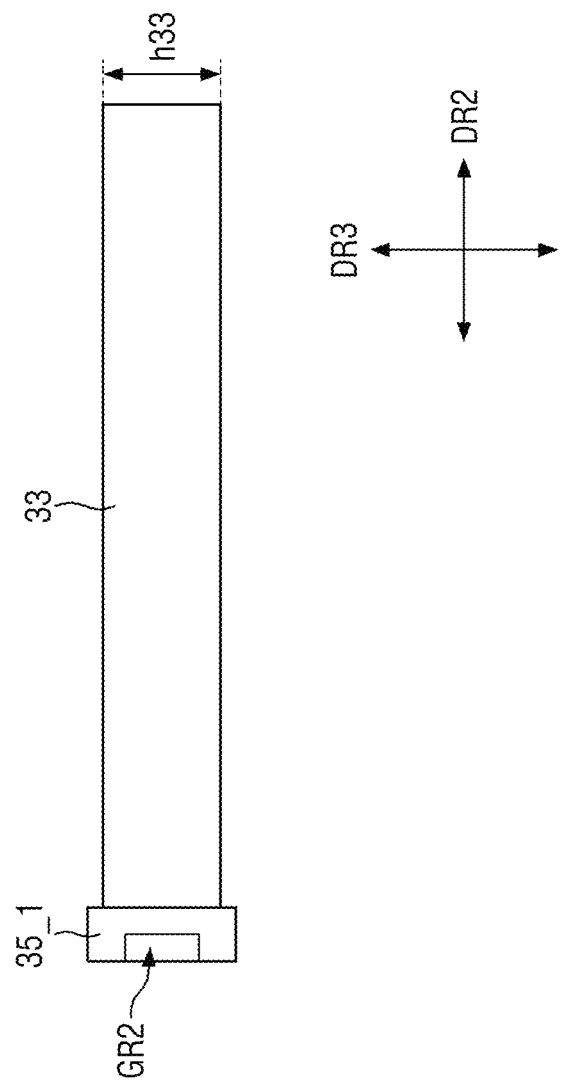
FIG. 13 is a side view of a horn body portion and a horn tip portion of an apparatus for manufacturing a display device according to another exemplary embodiment.
Figure 14:
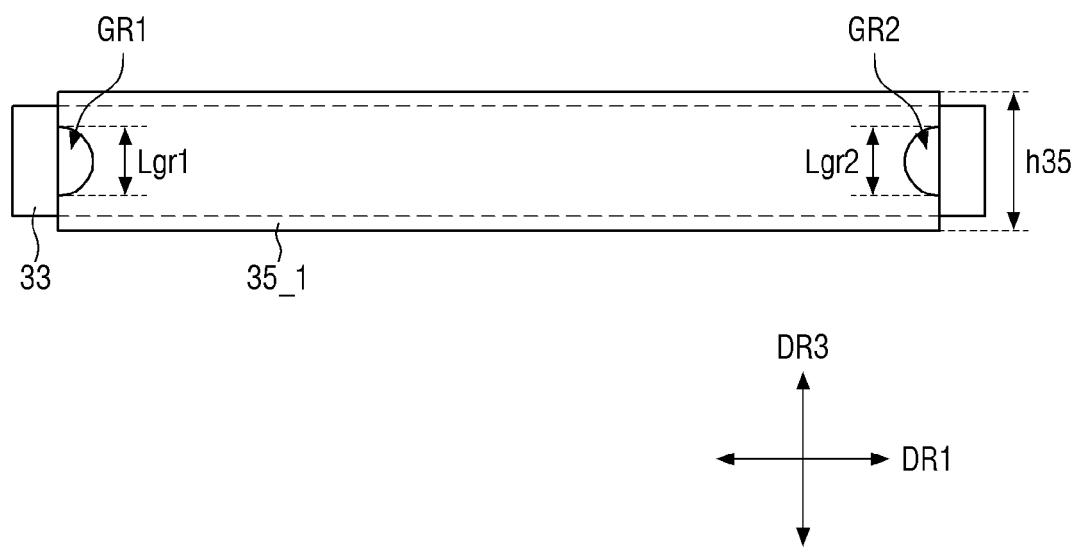
FIG. 14 is a front view of a horn body portion and a horn tip portion of an apparatus for manufacturing a display device according to another exemplary embodiment.
Figure 15A:
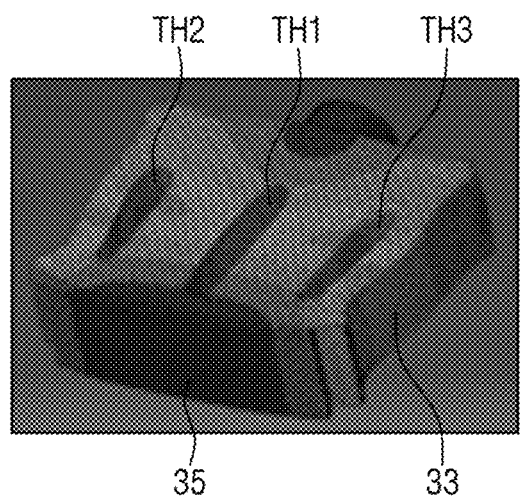
FIGS. 15A and 15B are views showing vibration amplitudes of respective regions of an apparatus for manufacturing a display device.
Figure 15B:
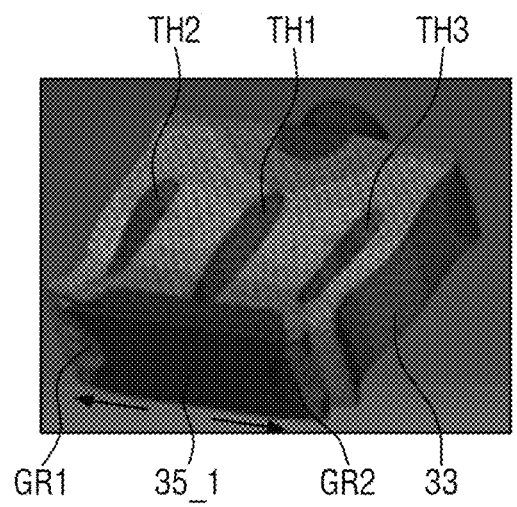

FIG. 12 is a perspective view of an apparatus for manufacturing a display device according to another exemplary embodiment, FIG. 13 is a side view of a horn body portion and a horn tip portion of an apparatus for manufacturing a display device according to another exemplary embodiment, FIG. 14 is a front view of a horn body portion and a horn tip portion of an apparatus for manufacturing a display device according to another exemplary embodiment, and FIGS. 15A and 15B are views showing vibration amplitudes of respective regions of an apparatus for manufacturing a display device. FIG. 15A shows the vibration amplitude of a horn tip portion 35_1 of a display device manufacturing apparatus 10_1 in the first direction DR1 when the horn tip portion 35_1 does not include horn indentation grooves GR1 and GR2, and FIG. 15B shows the vibration amplitude of a horn tip portion 35_1 of a display device manufacturing apparatus 10_1 in the first direction DR1 when the horn tip portion 35_1 includes horn indentation grooves GR1 and GR2.

Referring to FIGS. 12 to 15, a display device manufacturing apparatus 10_1 according to the present exemplary embodiment is different from the aforementioned display device manufacturing apparatus 10_1 according to FIG. 1 in that a horn tip portion 35_1 further includes horn indentation grooves GR1 and GR2.

More specifically, the horn tip portion 35_1 of the display device manufacturing apparatus 10_1 according to the present exemplary embodiment may include horn indentation grooves GR1 and GR2. As shown in FIG. 14, the horn tip portion 35_1 may include long side edges extending along the first direction DR1 and short side edges extending along the third direction DR3. The horn indentation grooves GR1 and GR2 of the horn tip portion 35_1 may have shapes recessed from the short side edges of the horn tip portion 35_1, respectively. The horn indentation grooves GR1 and GR2 of the horn tip portion 35_1 may have shapes recessed from the intermediate region of the short side edges of the horn tip portion 35_1, respectively.

The horn tip portion 35_1 may include a first surface connected to the horn body portion 33 and a second surface facing the first surface.

Each of the horn indentation grooves GR1 and GR2 of the horn tip portion 35_1 may have a shape recessed in the second direction DR2 from the second surface of the horn tip portion 35_1.

Referring to FIGS. 15A and 15B, it can be found that the horn tip portion 35_1 of the display device manufacturing apparatus 10_1 includes the horn indentation grooves GR1 and GR2, and thus the vibration amplitude of the short side edge regions of the horn tip portion 35_1 in which the horn indentation grooves GR1 and GR2 are arranged, or the vibration amplitude of a peripheral region thereof increases. That is, in the display device manufacturing apparatus 10_1 according to the present exemplary embodiment, the horn tip portion 35_1 includes the horn indentation grooves GR1 and GR2, and thus it is possible to make the vibration amplitude of the horn tip portion 35_1 per region in the first direction DR1 uniform.

As shown in FIG. 14, the horn groove grooves GR1 and GR2 of the horn tip portion 35_1 may have a first length LGR1 and a second length LGR2 in the third direction DR3, respectively. The first length LGR1 and second length LGR2 of the horn indentation grooves GR1 and GR2 may be equal to each other.

Each of the first length LGR1 and second length LGR2 of the horn indentation grooves GR1 and GR2 in the third direction DR3 may be about 0.1 times to about 0.9 times the thickness h35 of the horn tip portion 35_1.

When each of the first length LGR1 and second length LGR2 of the horn indentation grooves GR1 and GR2 is about 0.1 times or more the thickness h35 of the horn tip portion 35_1, the vibration amplification of the horn body portion 33 and the horn tip portion 35_1 may be effectively increased. Further, when each of the first length LGR1 and second length LGR2 of the horn indentation grooves GR1 and GR2 is about 0.9 times or less the thickness h35 of the horn tip portion 35_1, the vibration amplitude of the short side edge regions of the horn body portion 33 and the horn tip portion 35_1 is larger than the vibration amplitude of the peripheral region excluding the short side edge regions of the horn body portion 33 and the horn tip portion 35_1, and thus non-uniform vibration amplitude over the entire region of the horn body portion 33 and the horn tip portion 35_1 may be prevented.

The horn indentation grooves GR1 and GR2 may be made shorter from the short side edges of the horn tip portion 35_1 toward the central region of the horn tip portion 35_1. That is, as shown in FIG. 14, the lengths of the horn indentation grooves GR1 and GR2 in the third direction DR3 may be decreased from the short side edges toward the central region of the horn tip portion 35_1. Thus, it is possible to gradually reduce the magnitude of the vibration to be amplified as it goes from the short edge regions where the horn indentation grooves GR1 and GR2 are arranged toward the central region.

Even in the present exemplary embodiment, in the display device manufacturing apparatus 10_1, the second horn groove TH2 and the third horn groove TH3 are arranged at one side and the other side of the first horn groove TH1 of the horn body portion 33, and thus the horn body portion 33 and the horn tip portion 35 may have a uniform vibration amplitude over the entire region along the first direction DR1.

Further, in the display device manufacturing apparatus 10_1 according to the present exemplary embodiment, as shown in FIG. 11B, the horn body portion 33 has a uniform thickness h33 along the second direction DR2, and thus the horn body portion 33 and the horn tip portion 35 may have a uniform vibration amplitude over the entire region along the first direction DR1.

FIG. 16 is a front view of a horn body portion and a horn tip portion of a display device manufacturing apparatus according to still another exemplary embodiment.

Referring to FIG. 16, horn indentation grooves GR1_1 and GR2_1 of a horn tip portion 35_2 of a display device manufacturing apparatus according to the present exemplary embodiment is different from the horn indentation grooves GR1 and GR2 of the horn tip portion 35 according to FIG. 5 in that the planar shape of each of the horn indentation grooves GR1_1 and GR2_1 is a triangle.

More specifically, the lengths of the horn indentation grooves GR1_1 and GR2_1 of the horn tip portion 35_2 of the display device manufacturing apparatus according to the present exemplary embodiment may be decreased from the short side edges toward the central region of the horn tip portion 35_2, and the planar shape of each of the horn indentation grooves GR1_1 and GR2_1 is a triangle. That is, the lengths of the horn indentation grooves GR1_1 and GR2_1 in the third direction DR3 may be reduced to a constant extent from the short side edges toward the central region of the horn tip portion 35_2.

The horn tip portion 35_2 of the display device manufacturing apparatus includes the horn indentation grooves GR1_1 and GR2_1, and thus the vibration amplitude of the short side edge regions of the horn tip portion 35_2 in which the horn indentation grooves GR1_1 and GR2_1 are arranged, or the vibration amplitude of a peripheral region thereof increases. That is, in the display device manufacturing apparatus according to the present exemplary embodiment, the horn tip portion 35_2 includes the horn indentation grooves GR1_1 and GR2_1, and thus it is possible to make the vibration amplitude of the horn tip portion 35_2 per region in the first direction DR1 uniform.

Even in the present exemplary embodiment, in the display device manufacturing apparatus, the second horn groove TH2 and the third horn groove TH3 are arranged at one side and the other side of the first horn groove TH1 of the horn body portion 33, and thus the horn body portion 33 and the horn tip portion 35_2 may have a uniform vibration amplitude over the entire region along the first direction DR1.

Further, in the display device manufacturing apparatus according to the present exemplary embodiment, the horn body portion 33 has a uniform thickness h33 along the second direction DR2, and thus the horn body portion 33 and the horn tip portion 35_2 may have a uniform vibration amplitude over the entire region along the first direction DR1.

FIG. 17 is a front view of a horn body portion and a horn tip portion of a display device manufacturing apparatus according to still another exemplary embodiment.

Referring to FIG. 17, horn indentation grooves GR1_2 and GR2_2 of a horn tip portion 35_3 of a display device manufacturing apparatus according to the present exemplary embodiment is different from the horn indentation grooves GR1_1 and GR2_1 of the horn tip portion 35_2 according to FIG. 16 in that the length decrease rate of the horn indentation grooves GR1_2 and GR2_2 in the third direction DR3 may decrease from the short side edges toward the central region of the horn tip portion 35_3.

The horn tip portion 35_3 of the display device manufacturing apparatus includes the horn indentation grooves GR1_2 and GR2_2, and thus the vibration amplitude of the short side edge regions of the horn tip portion 35_3 in which the horn indentation grooves GR1_2 and GR2_2 are arranged, or the vibration amplitude of a peripheral region thereof increases. That is, in the display device manufacturing apparatus according to the present exemplary embodiment, the horn tip portion 35_3 includes the horn indentation grooves GR1_2 and GR2_2, and thus it is possible to make the vibration amplitude of the horn tip portion 35_3 per region in the first direction DR1 uniform.

Even in the present exemplary embodiment, in the display device manufacturing apparatus, the second horn groove TH2 and the third horn groove TH3 are arranged at one side and the other side of the first horn groove TH1 of the horn body portion 33, and thus the horn body portion 33 and the horn tip portion 35_3 may have a uniform vibration amplitude over the entire region along the first direction DR1.

Further, in the display device manufacturing apparatus according to the present exemplary embodiment, the horn body portion 33 has a uniform thickness h33 along the second direction DR2, and thus the horn body portion 33 and the horn tip portion 35_3 may have a uniform vibration amplitude over the entire region along the first direction DR1.

Figure 18:
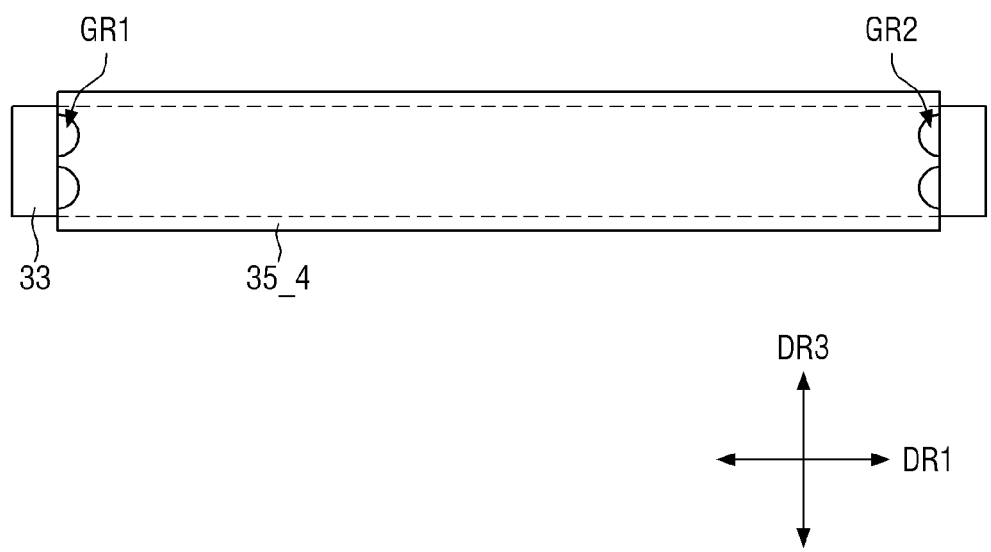
FIG. 18 is a front view of a horn body portion and a horn tip portion of an apparatus for manufacturing a display device according to still another exemplary embodiment.

FIG. 18 is a front view of a horn body portion and a horn tip portion of a display device manufacturing apparatus according to still another exemplary embodiment.

Referring to FIG. 18, a horn tip portion 35_4 of a display device manufacturing apparatus according to the present exemplary embodiment is different from the horn tip portion 35 of the aforementioned display device manufacturing apparatus according to an exemplary embodiment in that a plurality of horn indentation grooves GR1 and a plurality of horn indentation grooves GR2 are provided.

More specifically, the horn indentation grooves GR1 and GR2 of the horn tip portion 35_4 of the display device manufacturing apparatus according to the present exemplary embodiment may be arranged to be spaced apart from each other in the third direction DR3.

Although it shown in FIG. 18 that two horn indentation grooves GR1 and two horn indentation grooves GR2, which are recessed from the short side edges of the horn tip portion 35_4, are arranged, the inventive concepts are not limited thereto, and three or more horn indentation grooves GR1 and three or more horn indentation grooves GR2 may be recessed from the short side edges.

The horn tip portion 35_4 of the display device manufacturing apparatus includes the horn indentation grooves GR1 and GR2, and thus the vibration amplitude of the short side edge regions of the horn tip portion 35_4 in which the horn indentation grooves GR1 and GR2 are arranged, or the vibration amplitude of a peripheral region thereof increases. That is, in the display device manufacturing apparatus according to the present exemplary embodiment, the horn tip portion 35_4 includes the horn indentation grooves GR1 and GR2, and thus it is possible to make the vibration amplitude of the horn tip portion 35_4 per region in the first direction DR1 uniform.

Even in the present exemplary embodiment, in the display device manufacturing apparatus, the second horn groove TH2 and the third horn groove TH3 are arranged at one side and the other side of the first horn groove TH1 of the horn body portion 33, and thus the horn body portion 33 and the horn tip portion 35_4 may have a uniform vibration amplitude over the entire region along the first direction DR1.

Further, in the display device manufacturing apparatus according to the present exemplary embodiment, the horn body portion 33 has a uniform thickness h33 along the second direction DR2, and thus the horn body portion 33 and the horn tip portion 35_4 may have a uniform vibration amplitude over the entire region along the first direction DR1.

Figure 19:
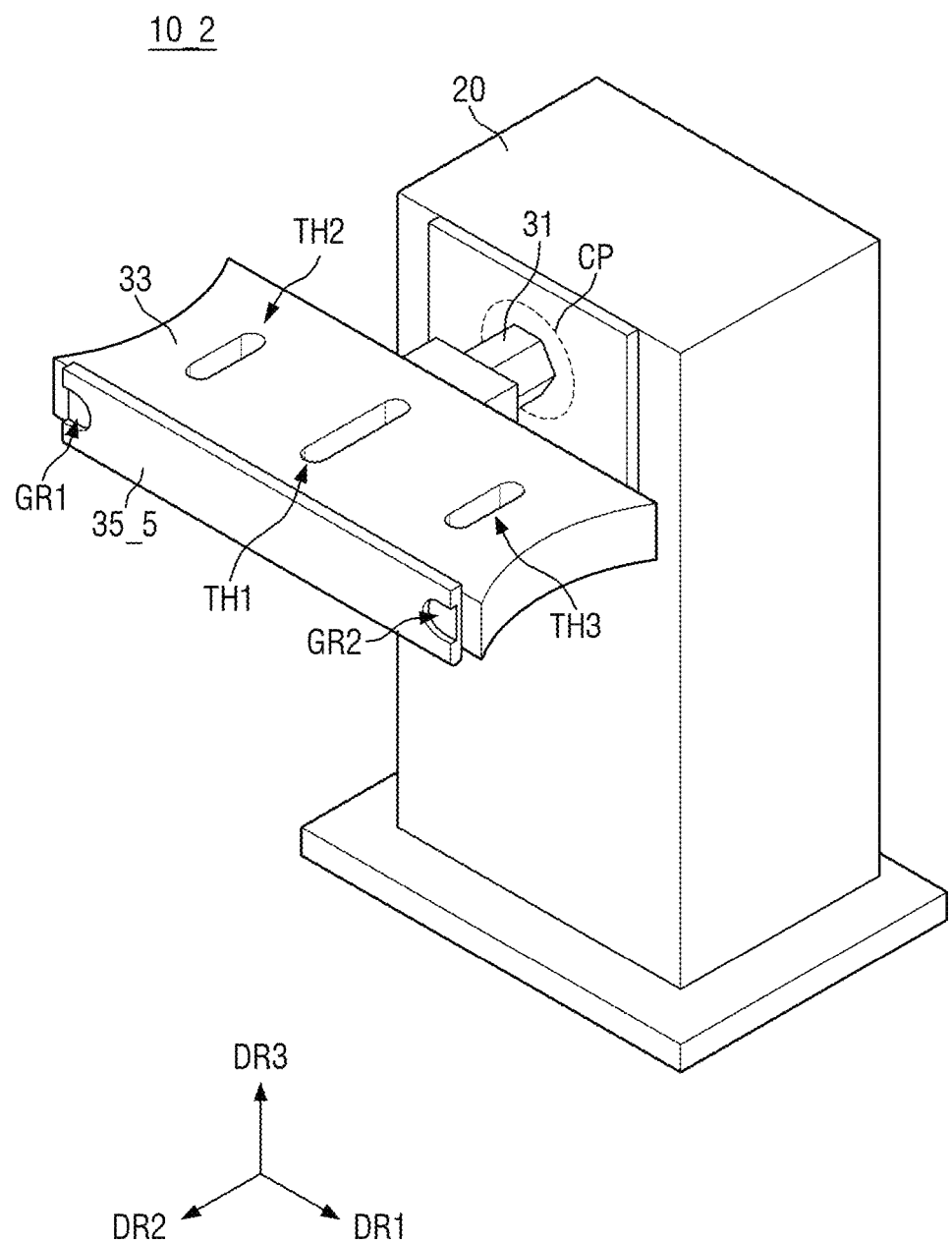
FIG. 19 is a perspective view of an apparatus for manufacturing a display device according to still another exemplary embodiment.
Figure 20:
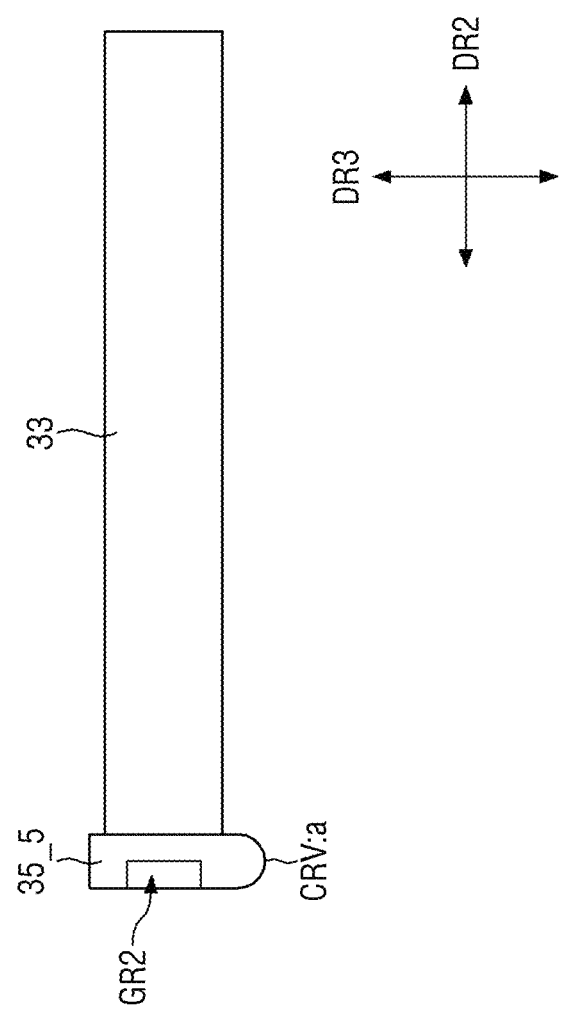
FIG. 20 is a side view of a horn body portion and a horn tip portion of an apparatus for manufacturing a display device according to still another exemplary embodiment.
Figure 21:
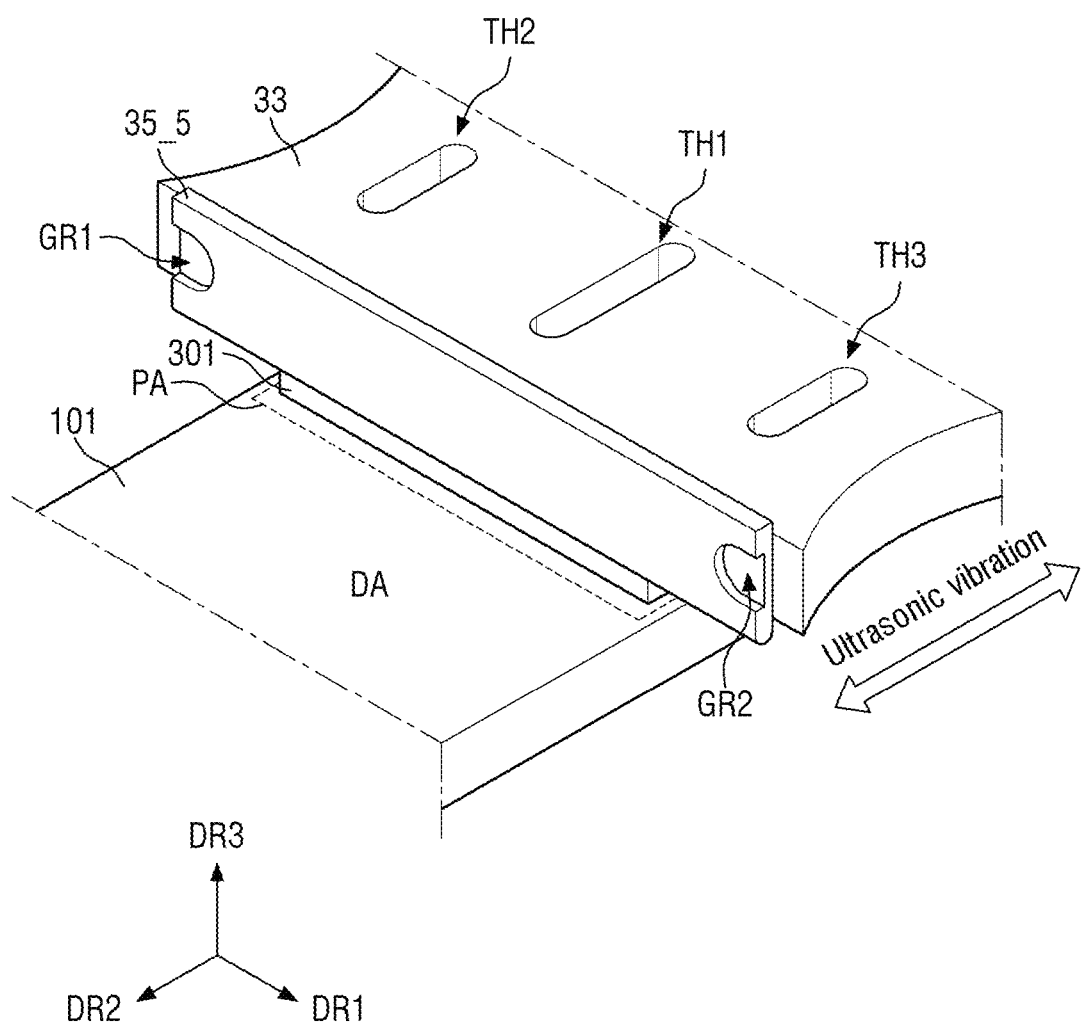
FIG. 21 is a perspective view showing the bonding of a bonding object by an apparatus for manufacturing a display device according to still another exemplary embodiment.

FIG. 19 is a perspective view of a display device manufacturing apparatus according to still another exemplary embodiment, FIG. 20 is a side view of a horn body portion and a horn tip portion of a display device manufacturing apparatus according to still another exemplary embodiment, FIG. 21 is a perspective view showing the bonding of a bonding object by a display device manufacturing apparatus according to still another exemplary embodiment, and FIG. 22 is a perspective view showing the bonding of a bonding object by a display device manufacturing apparatus according to still another exemplary embodiment.

Referring to FIGS. 19 to 22, the shape of a horn tip portion 35_5 of a display device manufacturing apparatus 10_2 according to the present exemplary embodiment is different from the shape of the horn tip portion 35 of the display device manufacturing apparatus according to FIG. 1.

More specifically, in the horn tip portion 35_5 of a display device manufacturing apparatus 10_2 according to the present exemplary embodiment, its lower surface contacting a boding target object may have a curved shape having a predetermined curvature CRV. As described above, the bonding object may include a signal wiring PAD disposed on the display substrate 101 and a lead wiring LE disposed on the base substrate 301.

Further, in the horn tip portion 35_5 of a display device manufacturing apparatus 10_2 according to the present exemplary embodiment, the lower surface of the horn tip portion 35_5 may have a semispherical shape having a curvature a. That is, the lower surface of the horn tip portion 35_5 may have a predetermined curvature a.

Figure 22A:
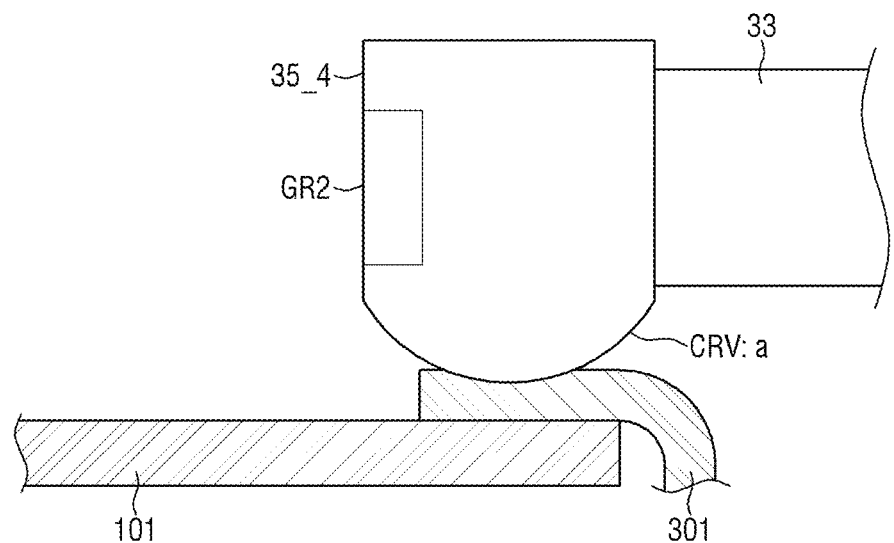
FIG. 22A and FIG. 22B are perspective views showing the bonding of a bonding object by an apparatus for manufacturing a display device according to still another exemplary embodiment.
Figure 22B:
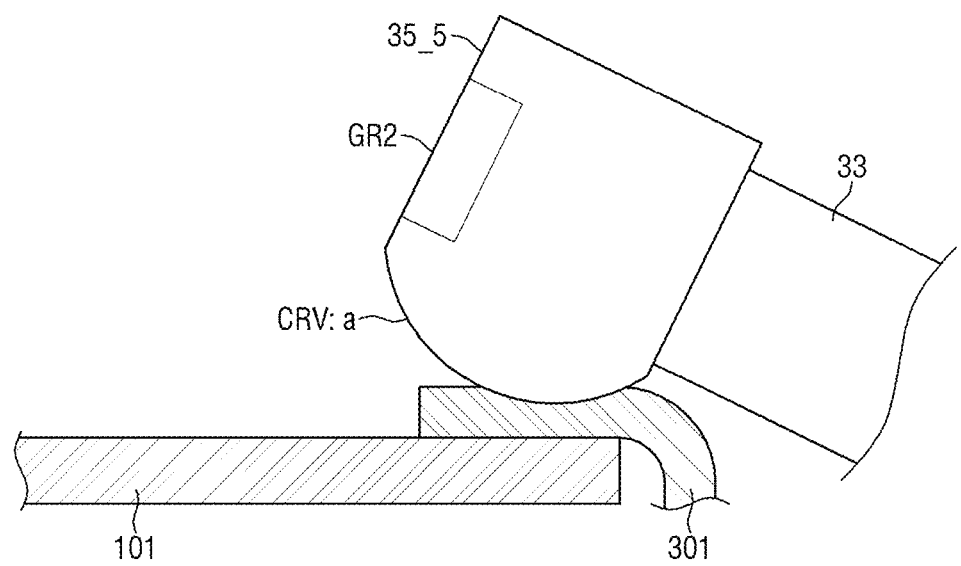

As shown in FIG. 22A, the display device manufacturing apparatus 10_2 may extend in a direction perpendicular to the bonding direction of the bonding object, but as shown in FIG. 22B, the display device manufacturing apparatus 10_2 may not extend in a direction perpendicular to the bonding direction of the bonding object and may be inclined in a downward direction, for example, in the third direction DR3 to form an acute angle with respect to the bonding direction of the bonding object.

As shown in FIG. 22B, when the horn tip portion 35_5 applies a vibration signal and pressure to the bonding object in a state where the display device manufacturing apparatus 10_2 forms an acute angle with respect to the bonding direction of the bonding object, there is a possibility that a portion where the base substrate 301 of the flexible printed circuit board and/or the lead wiring LE disposed on the base substrate 301 is in contact with the horn tip portion 35_5 may be subjected to a greater pressure.

However, as in the present exemplary embodiment, when the horn tip portion 35_5 of the display device manufacturing apparatus 10_2 has a lower surface contacting the bonding object and having a predetermined curvature CRV, the base substrate 301 of the flexible printed circuit board and/or the lead wiring LE disposed on the base substrate 301 may be in contact with the horn tip portion 35_5 while having a larger contact region at a portion where the base substrate 301 of the flexible printed circuit board and/or the lead wiring LE disposed on the base substrate 301 is in contact with the horn tip portion 35_5, thereby reducing the possibility of abrasion and/or rupture due to high pressure.

Further, when the lower surface of the horn tip portion 35_5 has a curved shape having a predetermined curvature a, the contact region between the horn tip portion 35_5 and the bonding object may be made constant regardless of a case where the display device manufacturing apparatus 10_2 extends in a direction perpendicular to the bonding direction of the bonding object as shown in FIG. 22A or a case where the display device manufacturing apparatus 10_2 does not extend in a direction perpendicular to the bonding direction of the bonding object and is inclined in a downward direction, for example, in the third direction DR3 to form an acute angle with respect to the bonding direction of the bonding object, and thus the bonding reliability of a display device may be improved.

Even in this exemplary embodiment, the horn tip portion 35_5 of the display device manufacturing apparatus includes the horn indentation grooves GR1 and GR2, and thus the vibration amplitude of the short side edge regions of the horn tip portion 35_4 in which the horn indentation grooves GR1 and GR2 are arranged, or the vibration amplitude of a peripheral region thereof increases. That is, in the display device manufacturing apparatus according to the present exemplary embodiment, the horn tip portion 35_5 includes the horn indentation grooves GR1 and GR2, and thus it is possible to make the vibration amplitude of the horn tip portion 35_5 per region in the first direction DR1 uniform.

Further, in the display device manufacturing apparatus, the second horn groove TH2 and the third horn groove TH3 are arranged at one side and the other side of the first horn groove TH1 of the horn body portion 33, and thus the horn body portion 33 and the horn tip portion 35_5 may have a uniform vibration amplitude over the entire region along the first direction DR1.

Further, in the display device manufacturing apparatus according to the present exemplary embodiment, the horn body portion 33 has a uniform thickness h33 along the second direction DR2, and thus the horn body portion 33 and the horn tip portion 35_5 may have a uniform vibration amplitude over the entire region along the first direction DR1.

Unlike that shown in FIGS. 19 to 22, in the display device manufacturing apparatus, as shown in FIG. 1, the horn tip portion 35_5 may not be provided with horn indentation grooves GR1 and GR2. That is, in this case, the display device manufacturing apparatus may include the horn body portion 33 having a plurality of horn grooves and the horn tip portions 35_5 including a lower surface having a curved shape.

Figure 23:
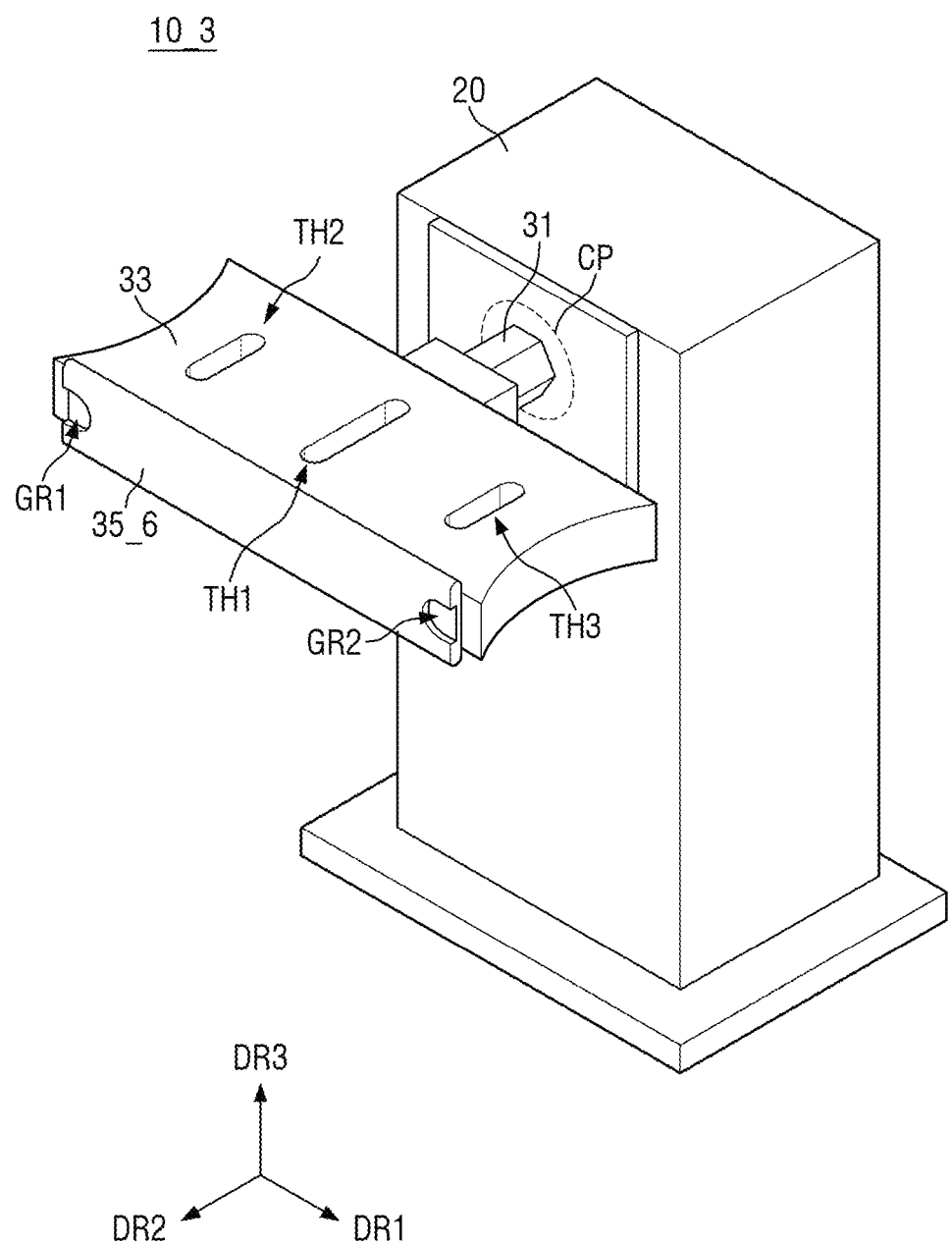
FIG. 23 is a side view of a horn body portion and a horn tip portion of an apparatus for manufacturing a display device according to another exemplary embodiment.

FIG. 23 is a side view of a horn body portion and a horn tip portion of a display device manufacturing apparatus according to another exemplary embodiment.

Referring to FIG. 23, a horn tip portion 35_6 of the a display device manufacturing apparatus according to the present exemplary embodiment is different from the horn tip portion 35_5 according to FIG. 20 in that the horn tip portion 35_6 includes not only a lower surface contacting a bonding object but also an upper surface facing the lower surface, each of which have a curved shape having a predetermined curvature CRV.

More specifically, the horn tip portion 35_6 according to the present exemplary embodiment may include not only a lower surface contacting a bonding object but also an upper surface facing the lower surface, each of which has a curved shape having a predetermined curvature CRV. The curvature of the upper surface of the horn tip portion 35_6 may be equal to the curvature of the lower surface of the horn tip portion 35_6, but the inventive concepts are not limited thereto.

As in the present exemplary embodiment, when the horn tip portion 35_6 includes not only the lower surface having a curved shape but also the upper surface having a curved shape, when the lower surface of the horn tip portion 35_6 is worn by use, the upper surface of the horn tip portion 35_6 may be used to apply a vibration signal and a pressure to the bonding object by vertically switching the horn tip portion 35_6 along the third direction DR3.

As described above, according to the exemplary embodiments of the inventive concepts, there can be provided an apparatus for manufacturing a display device which applies a vibration of the same width for each region to a junction of the display device.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An apparatus for manufacturing a display device, comprising:
 a body configured to generate ultrasonic vibration; and
 a horn comprising a horn body portion connected to the body and configured to amplify the ultrasonic vibration and a horn tip portion connected to the horn body portion and configured to apply the ultrasonic vibration onto a bonding object,
 wherein:
 the horn body portion comprises a first surface, a second surface opposite to the first surface, and at least one body groove surrounded by the horn body portion and completely penetrating the horn body portion in a thickness direction from the first surface of the horn body portion to the second surface of the horn body portion;
 the horn body portion has constant thickness in the thickness direction;
 a first side of the horn body portion and a second side of the horn body portion opposite to the first side of the horn body portion extend along a first direction;
 a third side of the horn body portion and a fourth side of the horn body portion opposite to the third side of the horn body portion extend along a second direction intersecting the first direction;
 the third side of the horn body portion and the fourth side of the horn body portion are curved; and
 a thickness of the entire horn body portion in the thickness direction is less than a width of the horn tip portion in the thickness direction.

2. The apparatus of claim 1, wherein:
 the at least one body groove comprises a second body groove disposed at one side of a first body groove in the first direction and a third body groove disposed at the other side of the first body groove in the first direction, and
 a distance from the first body groove to the second body groove is equal to a distance from the first body groove to the third body groove.

3. The apparatus of claim 2, wherein a length of the first body groove in the second direction is greater than a length of the second body groove in the second direction, and is greater than a length of the third body groove in the second direction.

4. The apparatus of claim 2, wherein:
 the horn body portion comprises at least one of a metal, a metal compound, a non-metallic inorganic compound, or an organic compound, and
 the horn tip portion has a uniform amplitude along the first direction during ultrasonic vibration of the horn tip portion.

5. The apparatus of claim 4, wherein a difference between a minimum amplitude of the horn tip portion and a maximum amplitude of the horn tip portion is about 5% or less.

6. The apparatus of claim 1, wherein:
the horn tip portion comprises a first surface connected to the horn body portion and a second surface opposite to the first surface of the horn tip portion, and
the second surface of the horn tip portion comprises a tip groove recessed from edges spaced apart from each other along the first direction.

7. The apparatus of claim 6, wherein the tip groove is recessed in the second direction from the second surface of the horn tip portion toward the first surface of the horn tip portion.

8. The apparatus of claim 1, wherein the body comprises a power supply unit configured to supply a power, a signal converter configured to convert an electrical signal of the supplied power into a vibration signal, and a vibration amplifier configured to amplify an amplitude of the vibration signal.

9. The apparatus of claim 1, wherein:
the bonding object comprises a signal wiring disposed on a target panel and a lead wiring disposed on a printed circuit board, and
the signal wiring and the lead wiring are ultrasonically bonded to each other.

10. The apparatus of claim 9, wherein the horn tip portion is in direct contact with the printed circuit board and configured to apply vibration to the printed circuit board.

11. An apparatus for manufacturing a display device, comprising:
a body configured to generate ultrasonic vibration; and
a horn comprising a horn body portion connected to the body and configured to amplify the ultrasonic vibration and a horn tip portion connected to the horn body portion and configured to apply the ultrasonic vibration onto a bonding object, wherein:
the horn body portion comprises a first surface, a second surface opposite to the first surface, and at least one body groove surrounded by the horn body portion and completely penetrating the horn body portion in a thickness direction from the first surface of the horn body portion to the second surface of the horn body portion;
the horn body portion has constant thickness in the thickness direction;
the horn tip portion comprises a lower surface facing the bonding object
the lower surface of the horn tip portion has a curved shape;
a first side of the horn body portion and a second side of the horn body portion opposite to the first side of the horn body portion extend along a first direction;
a third side of the horn body portion and a fourth side of the horn body portion opposite to the third side of the horn body portion extend along a second direction intersecting the first direction;
the third side of the horn body portion and the fourth side of the horn body portion are curved; and
a thickness of the entire horn body portion in the thickness direction is less than a width of the horn tip portion in the thickness direction.

12. The apparatus of claim 11, wherein the curved shape of the lower surface has a predetermined curvature.

* * * * *